(12) United States Patent
Nomura et al.

(10) Patent No.: US 10,759,691 B2
(45) Date of Patent: Sep. 1, 2020

(54) GLASS SUBSTRATE, LAMINATED SUBSTRATE, AND PRODUCTION METHOD FOR GLASS SUBSTRATE

(71) Applicant: AGC Inc., Chiyoda-ku (JP)

(72) Inventors: Shuhei Nomura, Tokyo (JP); Kazutaka Ono, Tokyo (JP)

(73) Assignee: AGC Inc., Chiyoda-ku (JP)

( * ) Notice: Subject to any disclaimer, the term of this patent is extended or adjusted under 35 U.S.C. 154(b) by 226 days.

(21) Appl. No.: 15/666,862

(22) Filed: Aug. 2, 2017

(65) Prior Publication Data

US 2017/0327408 A1 Nov. 16, 2017

Related U.S. Application Data

(63) Continuation of application No. PCT/JP2016/053017, filed on Feb. 2, 2016.

(30) Foreign Application Priority Data

| Feb. 6, 2015 | (JP) | 2015-022719 |
| Dec. 10, 2015 | (JP) | 2015-241303 |

(51) Int. Cl.
*B32B 15/04* (2006.01)
*B32B 17/06* (2006.01)
(Continued)

(52) U.S. Cl.
CPC ............... *C03C 4/085* (2013.01); *B32B 7/12* (2013.01); *B32B 9/041* (2013.01); *B32B 17/064* (2013.01);
(Continued)

(58) Field of Classification Search
USPC .................................. 428/426, 428
See application file for complete search history.

(56) References Cited

U.S. PATENT DOCUMENTS

| 2006/0003884 A1* | 1/2006 | Nishizawa .............. C03C 3/091 501/72 |
| 2009/0270242 A1 | 10/2009 | Yanase et al. |

(Continued)

FOREIGN PATENT DOCUMENTS

| JP | 3153710 | 4/2001 |
| JP | 2004-315354 | 11/2004 |

(Continued)

OTHER PUBLICATIONS

International Search Report and Written Opinion dated Mar. 29, 2016 in PCT/JP2016/053055, 17 pages (with English translation).

(Continued)

*Primary Examiner* — Lauren R Colgan
(74) *Attorney, Agent, or Firm* — Oblon, McClelland, Maier & Neustadt, L.L.P.

(57) ABSTRACT

The present invention provides a glass substrate in which in a heat treatment step of sticking a silicon substrate and a glass substrate to each other, an alkali ion is hardly diffused into the silicon substrate, and a residual strain generated in the silicon substrate is small. A glass substrate of the present invention has: an average thermal expansion coefficient $\alpha_{50/100}$ at 50° C. to 100° C. of 2.70 ppm/° C. to 3.20 ppm/° C.; an average thermal expansion coefficient $\alpha_{200/300}$ at 200° C. to 300° C. of 3.45 ppm/° C. to 3.95 ppm/° C.; a value $\alpha_{200/300}/\alpha_{50/100}$ obtained by dividing the average thermal expansion coefficient $\alpha_{200/300}$ at 200° C. to 300° C. by the average thermal expansion coefficient $\alpha_{50/100}$ at 50° C. to 100° C. of 1.20 to 1.30; and a content of an alkali metal oxide being 0% to 0.1% as expressed in terms of a molar percentage based on oxides.

18 Claims, 2 Drawing Sheets

(51) Int. Cl.
*C03C 4/08* (2006.01)
*C03C 3/085* (2006.01)
*C03C 3/087* (2006.01)
*C03B 25/02* (2006.01)
*C03C 27/00* (2006.01)
*B32B 9/04* (2006.01)
*B32B 7/12* (2006.01)
*C03C 3/091* (2006.01)
*C03B 17/06* (2006.01)
*C03C 3/093* (2006.01)
*C03C 17/25* (2006.01)
*G02B 5/20* (2006.01)
*G02B 5/22* (2006.01)

(52) U.S. Cl.
CPC ............ *C03B 17/067* (2013.01); *C03B 25/02* (2013.01); *C03C 3/085* (2013.01); *C03C 3/087* (2013.01); *C03C 3/091* (2013.01); *C03C 3/093* (2013.01); *C03C 4/082* (2013.01); *C03C 17/25* (2013.01); *C03C 27/00* (2013.01); *G02B 5/208* (2013.01); *G02B 5/223* (2013.01); *G02B 5/226* (2013.01); *B32B 2307/306* (2013.01); *B32B 2383/00* (2013.01)

(56) References Cited

U.S. PATENT DOCUMENTS

2009/0294773 A1* 12/2009 Ellison .................... C03C 3/087
                                                            257/72
2011/0318561 A1* 12/2011 Murata ................... C03C 3/091
                                                            428/220
2012/0302063 A1* 11/2012 Markham ................. B24B 1/00
                                                            438/692
2013/0267402 A1    10/2013 Nishizawa
2014/0091419 A1    4/2014  Hasegawa et al.
2015/0093561 A1*  4/2015  Tokunaga ............... C03C 3/091
                                                            428/220
2015/0160386 A1    6/2015  Takemura

FOREIGN PATENT DOCUMENTS

| JP | 2009-286689 | 12/2009 |
| JP | 2011-20864 | 2/2011 |
| JP | 2013-257532 A | 12/2013 |
| WO | WO 2010/107111 A1 | 9/2010 |
| WO | WO 2013/099970 A1 | 7/2013 |
| WO | WO 2013/183681 A1 | 12/2013 |
| WO | WO2013183681 * | 12/2013 |
| WO | 2014/034386 A1 | 3/2014 |

OTHER PUBLICATIONS

International Search Report dated Mar. 29, 2016 in PCT/JP2016/053047, filed on Feb. 2, 2016 (with English translation).
Written Opinion dated Mar. 29, 2016 in PCT/JP2016/053047, filed on Feb. 2, 2016.

* cited by examiner

GLASS SUBSTRATE, LAMINATED SUBSTRATE, AND PRODUCTION METHOD FOR GLASS SUBSTRATE

CROSS-REFERENCE TO RELATED APPLICATIONS

This application is a Continuation of PCT/JP2015/053047, which was filed on Feb. 2, 2016. This application is based upon and claims the benefit of priority to Japanese Application No. 2015-241303, which was filed on Dec. 10, 2015, and to Japanese Application No. 2015-022719, which was filed on Feb. 6, 2015.

TECHNICAL FIELD

The present invention relates to a glass substrate, a laminated substrate, and a method for producing a glass substrate.

BACKGROUND ART

As for image sensors, such as a chip size package (CSP), etc., a mode of protection by sticking a glass substrate onto a silicon substrate is known, and a glass for silicon pedestal in which an elongation percentage by thermal expansion is made close to an elongation percentage by thermal expansion of a silicon substrate to be bonded to a glass is proposed (see, for example, Patent Document 1).

In addition, in the semiconductor assembly process so far, a series of assembly processes in which after cutting a silicon substrate and a glass substrate in a wafer state, respectively, the silicon substrate and the glass substrate are stuck to each other, followed by die bonding, wire bonding, molding, and so on, are performed. In recent years, the wafer-level package technology in which a silicon substrate and a glass substrate in a full-scale wafer state are stuck to each other and subjected to an assembly process, followed by cutting is in the limelight as a next-generation CSP technology.

In order to stick the silicon substrate and the glass substrate to each other, a heat treatment step is required. In the heat treatment step, for example, a laminated substrate obtained by sticking the silicon substrate and the glass substrate to each other at a temperature of 200° C. to 400° C. is subjected to temperature decrease to room temperature. At this time, if there is a difference in thermal expansion coefficient between the silicone substrate and the glass substrate, a large residual strain (residual deformation) is caused in the silicon substrate due to the difference in thermal expansion coefficient.

In the wafer-level package technology, since the silicon substrate and the glass substrate are stuck to each other in the wafer state, even as for the difference in thermal expansion coefficient, which has not been problematic so far, the residual strain is liable to be caused in the silicon substrate. In addition, in the heat treatment step, it is required that an alkali ion is not diffused from the glass substrate into the silicon substrate.

BACKGROUND ART DOCUMENT

Patent Document

Patent Document 1: Japanese Patent No. 3153710

SUMMARY OF THE INVENTION

Problems that the Invention is to Solve

Patent Document 1 proposes a glass for silicon pedestal which is characterized in that a ratio $\alpha_1/\alpha_2$ of an elongation percentage $\alpha_1$ by thermal expansion of a glass to an elongation percentage $\alpha_2$ by thermal expansion of a silicon substrate to be bonded to the glass is a value ranging from 0.8 to 1.2. However, regarding the glasses of the working examples disclosed in Patent Document 1, the coincidence of thermal expansion coefficient with the silicon substrate is insufficient, so that in the wafer-level package technology, a residual strain is liable to be generated in the silicone substrate.

Then, the present invention provides a glass substrate and a method for producing a glass substrate, in which in a heat treatment step of sticking a silicon substrate and a glass substrate to each other, an alkali ion is hardly diffused into the silicon substrate, and a residual strain generated in the silicon substrate is small. Or, the present invention provides a laminated substrate using the foregoing glass substrate.

Means for Solving the Problems

A glass substrate of the present invention has:
an average thermal expansion coefficient $\alpha_{50/100}$ at 50° C. to 100° C. of 2.70 ppm/° C. to 3.20 ppm/° C.;
an average thermal expansion coefficient $\alpha_{200/300}$ at 200° C. to 300° C. of 3.45 ppm/° C. to 3.95 ppm/° C.;
a value $\alpha_{200/300}/\alpha_{50/100}$ obtained by dividing the average thermal expansion coefficient $\alpha_{200/300}$ at 200° C. to 300° C. by the average thermal expansion coefficient $\alpha_{50/100}$ at 50° C. to 100° C. of 1.20 to 1.30; and
a content of an alkali metal oxide being 0% to 0.1% as expressed in terms of a molar percentage based on oxides.

A laminated substrate of the present invention includes:
the above-described glass substrate; and a silicon substrate laminated on the glass substrate.

Additionally, a laminated substrate of the present invention includes: a glass substrate; and a silicon substrate laminated on the glass substrate,
a difference $\Delta\alpha_{50/100}$ ($=\alpha_{50/100}-\alpha_{Si50/100}$) between an average thermal expansion coefficient $\alpha_{50/100}$ at 50° C. to 100° C. of the glass substrate and an average thermal expansion coefficient $\alpha_{Si50/100}$ at 50° C. to 100° C. of the silicon substrate is −0.25 ppm/° C. to 0.25 ppm/° C.,
a difference $\Delta\alpha_{200/300}$ ($=\alpha_{200/300}-\alpha_{Si200/300}$) between an average thermal expansion coefficient $\alpha_{200/300}$ at 200° C. to 300° C. of the glass substrate and an average thermal expansion coefficient $\alpha_{Si200/300}$ at 200° C. to 300° C. of the silicon substrate is −0.25 ppm/° C. to 0.25 ppm/° C.,
($\Delta\alpha_{200/300}-\Delta\alpha_{50/100}$) is −0.16 ppm/° C. to 0.16 ppm/° C., and
a content of an alkali metal oxide in the glass substrate is 0% to 0.1% as expressed in terms of a molar percentage based on oxides.

A method for producing a glass substrate of the present invention is a method including:
a melting step of heating glass raw materials to obtain a molten glass;
a refining step of removing bubbles from the molten glass;
a forming step of forming the molten glass into a sheet-like shape to obtain a glass ribbon; and
a cooling step of gradually cooling the glass ribbon to a room temperature state, in which the resulting glass substrate has a composition including, as expressed in terms of a molar percentage based on oxides:
$SiO_2$: 50% to 75%;
$Al_2O_3$: 6% to 16%;
$B_2O_3$: 0% to 15%;
MgO: 0% to 15%;
CaO: 0% to 13%;
SrO: 0% to 11%; and
BaO: 0% to 9.5%,
a content of an alkali metal oxide is 0% to 0.1% as expressed in terms of a molar percentage based on oxides, and
the composition of the resulting glass substrate and an average cooling rate R (unit: °C./min) from a temperature at which a viscosity of the glass ribbon in the cooling step is $10^{13}$ dPa·sec to a temperature at which the viscosity thereof is $10^{14.5}$ dPa·sec satisfy the following condition (1), condition (2), condition (3), and condition (4):

{0.0177×(content of $SiO_2$)−0.0173×(content of $Al_2O_3$)+0.0377×(content of $B_2O_3$)+0.0771×(content of MgO)+0.1543×(content of CaO)+0.1808×(content of SrO)+0.2082×(content of BaO)+0.0344×$\log_{10}$ R} is 2.70 to 3.20;  Condition (1):

{0.0181×(content of $SiO_2$)+0.0004×(content of $Al_2O_3$)+0.0387×(content of $B_2O_3$)+0.0913×(content of MgO)+0.1621×(content of CaO)+0.1900×(content of SrO)+0.2180×(content of BaO)+0.0391×$\log_{10}$ R} is 3.13 to 3.63;  Condition (2):

{0.0177×(content of $SiO_2$)+0.0195×(content of $Al_2O_3$)+0.0323×(content of $B_2O_3$)+0.1015×(content of MgO)+0.1686×(content of CaO)+0.1990×(content of SrO)+0.2179×(content of BaO)+0.0312×$\log_{10}$ R} is 3.45 to 3.95; and  Condition (3):

0.0111×(content of $SiO_2$)+0.0250×(content of $Al_2O_3$)+0.0078×(content of $B_2O_3$)+0.0144×(content of MgO)+0.0053×(content of CaO)+0.0052×(content of SrO)+0.0013×(content of BaO)−0.0041×$\log_{10}$ R} is 1.20 to 1.30,  Condition (4):

in which the content of $SiO_2$, the content of $Al_2O_3$, the content of $B_2O_3$, the content of MgO, the content of CaO, the content of SrO, and the content of BaO are respectively a content of each of the components contained in the resulting glass as expressed in terms of a molar percentage based on oxides.

In the present specification, the content of each of the components in the glass substrate and in the method for producing the same is expressed in terms of a molar percentage based on oxides unless otherwise indicated.

Advantage of the Invention

The present invention is able to provide a glass substrate and a method for producing a glass substrate, in which in a heat treatment step of sticking a silicon substrate and a glass substrate to each other, an alkali ion is hardly diffused into the silicon substrate, and a residual strain generated in the silicon substrate is small. Or, the present invention is able to provide a laminated substrate using the foregoing glass substrate.

BRIEF DESCRIPTION OF THE DRAWINGS

FIGS. 1A and 1B each show a glass substrate to be stuck to a silicon substrate according to an embodiment of the present invention, in which FIG. 1A is a cross-sectional view before sticking, and FIG. 1B is a cross-sectional view after sticking.

MODE FOR CARRYING OUT THE INVENTION

An embodiment of the present invention is hereunder described.

Figure 1A:
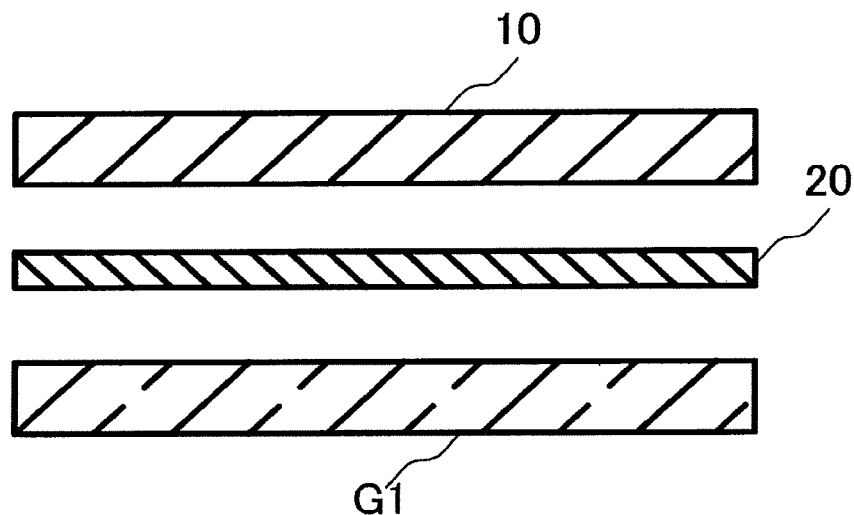
Figure 1B:
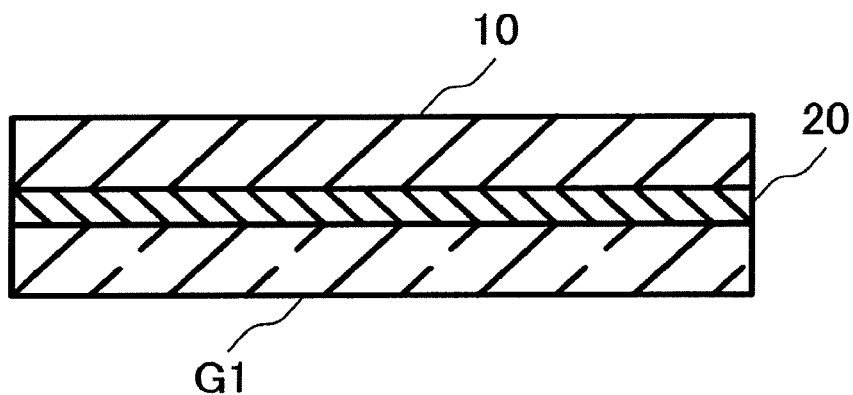

FIGS. 1A and 1B each show a glass substrate to be stuck to a silicon substrate according to an embodiment of the present invention. A glass substrate G1 obtained by the present invention as shown in FIG. 1A is stuck to a silicon substrate 10 at a temperature of, for example, 200° C. to 400° C. while interposing a resin 20 therebetween, whereby a laminated substrate 30 as shown in FIG. 1B is obtained. As the silicon substrate 10, for example, a full-scale wafer is used. Any material may be useful for the resin 20 so long as it withstands the temperature of 200° C. to 400° C.

The glass substrate according to an embodiment of the present invention is small in a difference in thermal expansion coefficient from the silicon substrate, and therefore, in the heat treatment step of sticking to the silicon substrate or the sequent heat treatment, the generation of a residual strain to be caused due to the difference in thermal expansion coefficient can be suppressed. For that reason, the glass substrate according to an embodiment of the present invention is suitable as a glass substrate for image sensors, such as MEMS, CMOS, CTS, etc., for which miniaturization of element due to the wafer-level package is effective.

In addition, the glass substrate according to an embodiment of the present invention is suitable as a cover glass for display devices for projection application, for example, a cover glass of LCOS (liquid crystal on silicon). For example, in the LCOS or image sensors, after forming an electronic circuit on a silicon substrate, the cover glass is adhered to the silicon substrate with a resin or a glass frit as an adhesive material. When the silicon substrate and the cover glass are coincident with or extremely close to each other in terms of a thermal expansion coefficient, a stress generated on the adhesive interface when the temperature varies at the time of device production or use is reduced. Thereby, a reduction of color unevenness to be caused due to photoelastic deformation, or an improvement of long-term reliability can be expected.

Furthermore, the glass substrate according to an embodiment of the present invention is suitable as a bored substrate of glass interposer (GIP) or a support glass for semiconductor backgrind. The glass substrate according to an embodiment of the present invention can be suitably used for any application for glass substrate to be used through sticking to a silicon substrate.

In the glass substrate according to an embodiment of the present invention, an average thermal expansion coefficient $\alpha_{50/100}$ at 50° C. to 100° C. is 2.70 ppm/° C. to 3.20 ppm/° C. $\alpha_{50/100}$ is preferably 2.80 ppm/° C. or more, more preferably 2.90 ppm/° C. or more, still more preferably 2.91 ppm/° C. or more, and especially preferably 2.92 ppm/° C. or more. In addition, $\alpha_{50/100}$ is preferably 3.10 ppm/° C. or less, more preferably 3.00 ppm/° C. or less, still more preferably 2.96 ppm/° C. or less, and especially preferably 2.94 ppm/° C. or less.

When $\alpha_{50/100}$ falls within the above-described range, since the difference in thermal expansion coefficient from the silicon substrate is small, in the heat treatment step of sticking the silicon substrate and the glass substrate to each other, the residual strain generated in the silicon substrate can be made small while securing a process margin.

The "average thermal expansion coefficient $\alpha_{50/100}$ at 50° C. to 100° C." as referred to herein is an average thermal expansion coefficient as measured by the method prescribed in JIS R3102 (1995), in which a temperature range of measuring the thermal expansion coefficient is 50° C. to 100° C.

The terms "A to B" expressing the above-described numerical value range are used in order to mean that the numerical values described before and after that are included as a lower limit value and an upper limit value, and in the following present specification, the terms "A to B" are used as the same meanings unless otherwise indicated.

In the glass substrate according to an embodiment of the present invention, an average thermal expansion coefficient $\alpha_{200/300}$ at 200° C. to 300° C. is 3.45 ppm/° C. to 3.95 ppm/° C. $\alpha_{200/300}$ is preferably 3.55 ppm/° C. or more, more preferably 3.65 ppm/° C. or more, especially preferably 3.66 ppm/° C. or more, and most preferably 3.68 ppm/° C. or more. In addition, $\alpha_{200/300}$ is preferably 3.85 ppm/° C. or less, more preferably 3.75 ppm/° C. or less, especially preferably 3.73 ppm/° C. or less, and most preferably 3.71 ppm/° C. or less.

When $\alpha_{200/300}$ falls within the above-described range, since the difference in thermal expansion coefficient from the silicon substrate is small, failures, such as generation of a residual strain to be caused due to the difference in thermal expansion coefficient from the silicon substrate, etc., can be meaningfully suppressed while securing a process margin on the occasion of sticking the glass substrate according to an embodiment of the present invention to the silicon substrate.

In addition, when $\alpha_{200/300}$ is 3.55 ppm/° C. to 3.85 ppm/° C., since the difference in thermal expansion coefficient from the silicon substrate is sufficiently small, the failures to be caused due to the difference in thermal expansion coefficient can be more suppressed.

The "average thermal expansion coefficient $\alpha_{200/300}$ at 200° C. to 300° C." as referred to herein is an average thermal expansion coefficient as measured by the method prescribed in JIS R3102 (1995), in which a temperature range of measuring the thermal expansion coefficient is 200° C. to 300° C.

In the glass substrate according to an embodiment of the present invention, a value $\alpha_{200/300}/\alpha_{50/100}$ that is a value obtained by dividing the average thermal expansion coefficient $\alpha_{200/300}$ at 200° C. to 300° C. by the average thermal expansion coefficient $\alpha_{50/100}$ at 50° C. to 100° C. is 1.20 to 1.30. When $\alpha_{200/300}/\alpha_{50/100}$ is 1.20 to 1.30, since the difference in thermal expansion coefficient from the silicon substrate is small, in the heat treatment step of sticking the silicon substrate and the glass substrate to each other, the residual strain generated in the silicon substrate is small. $\alpha_{200/300}/\alpha_{50/100}$ is preferably 1.24 to 1.27.

In the glass substrate according to an embodiment of the present invention, the content of an alkali metal oxide is 0% to 0.1%. Here, the alkali metal oxide refers to $Li_2O$, $Na_2O$, $K_2O$, and the like. When the content of the alkali metal oxide is 0.1% or less, in the heat treatment step of sticking the silicon substrate and the glass substrate to each other, the alkali ion is hardly diffused into the silicon substrate. The content of the alkali metal oxide is more preferably 0.05% or less, and still more preferably 0.02% or less, and it is especially preferred that the alkali metal oxide is not substantially contained. Here, it is meant by the terms "the alkali metal oxide is not substantially contained" that the alkali metal oxide is not contained at all, or the alkali metal oxide may be contained as an impurity which is unavoidably included on the production.

It is preferred that the glass substrate according to an embodiment of the present invention has a composition including:

$SiO_2$: 50% to 75%;
$Al_2O_3$: 6% to 16%;
$B_2O_3$: 0% to 15%;
MgO: 0% to 15%;
CaO: 0% to 13%;
SrO: 0% to 11%; and
BaO: 0% to 9.5%.

$SiO_2$ is a component of forming a structure of glass. When the content of $SiO_2$ is 50% or more, heat resistance, chemical durability, and weather resistance become satisfactory. When the content of $SiO_2$ is 75% or less, meltability becomes satisfactory while viscosity at the time of glass melting does not become excessively high. The content of $SiO_2$ is preferably 60% or more, and more preferably 64% or more. In addition, the content of $SiO_2$ is preferably 70% or less, and more preferably 68% or less.

When the content of $Al_2O_3$ is 6% or more, weather resistance, heat resistance, and chemical durability become satisfactory, and a Young's modulus becomes high. When the content of $Al_2O_3$ is 16% or less, meltability becomes satisfactory while viscosity at the time of glass melting does not become excessively high, and devitrification hardly takes place. The content of $Al_2O_3$ is preferably 8% or more, and more preferably 11% or more. In addition, the content of $Al_2O_3$ is preferably 14% or less.

Although $B_2O_3$ is not an essential component, when $B_2O_3$ is contained, meltability becomes satisfactory while viscosity at the time of glass melting does not become excessively high, and devitrification hardly takes place. When the content of $B_2O_3$ is 15% or less, a glass transition temperature can be made high, and a Young's modulus becomes high. The content of $B_2O_3$ is more preferably 3% or more. In addition, the content of $B_2O_3$ is preferably 12% or less, and more preferably 6% or less.

Although MgO is not an essential component, when MgO is contained, meltability becomes satisfactory while viscosity at the time of glass melting does not become excessively high, weather resistance is improved, and a Young's modulus becomes high. When the content of MgO is 15% or less, devitrification hardly takes place. The content of MgO is preferably 4% or more, and more preferably 6% or more. In addition, the content of MgO is preferably 10% or less, more preferably 9.5% or less, and still more preferably 9% or less.

Although CaO is not an essential component, when CaO is contained, meltability becomes satisfactory while viscosity at the time of glass melting does not become excessively high, and weather resistance is improved. When the content of CaO is 13% or less, devitrification hardly takes place. The content of CaO is preferably 4% or more. In addition, the content of CaO is preferably 10% or less, and more preferably 8% or less.

Although SrO is not an essential component, when SrO is contained, meltability becomes satisfactory while viscosity at the time of glass melting does not become excessively high, and weather resistance is improved. When the content of SrO is 11% or less, devitrification hardly takes place. The content of SrO is preferably 0.5% or more. In addition, the content of SrO is preferably 8% or less, and more preferably 3% or less.

Although BaO is not an essential component, when BaO is contained, meltability becomes satisfactory while viscosity at the time of glass melting does not become excessively high, and weather resistance is improved. When the content of BaO is 9.5% or less, devitrification hardly takes place. The content of BaO is preferably 3% or less, and more preferably 2% or less.

In the glass substrate according to an embodiment of the present invention, a total content of CaO, SrO, and BaO is preferably 7% or more. When the total content of CaO, SrO, and BaO is 7% or more, devitrification hardly takes place. The total content of CaO, SrO, and BaO is more preferably 7.5% or more, and still more preferably 8.0% or more.

In the glass substrate according to an embodiment of the present invention, it is preferable to satisfy a relation of {(content of $Al_2O_3$)≥(content of MgO)}. When the relation of {(content of $Al_2O_3$)≥(content of MgO)} is satisfied, it is easy to make the average thermal expansion coefficient of the glass substrate to conform to the average thermal expansion coefficient of the silicon substrate, and in the heat treatment step of sticking the silicon substrate and the glass substrate to each other, the residual strain generated in the silicon substrate is small.

In the glass substrate according to an embodiment of the present invention, a devitrification viscosity ($\eta_{TL}$) is preferably $10^{3.8}$ dPa·sec or more. When the devitrification viscosity is $10^{3.8}$ dPa·sec or more, forming can be stably performed. The devitrification viscosity is more preferably $10^{4.0}$ dPa·sec or more, and still more preferably $10^{4.2}$ dPa·sec or more.

In the glass substrate according to an embodiment of the present invention, when used as a cover glass of CMOS sensor, in order to make it harder to absorb a visible light, the content of $Fe_2O_3$ is preferably 200 ppm or less as expressed in terms of parts per million mass based on oxides. The content of $Fe_2O_3$ is more preferably 150 ppm or less, still more preferably 100 ppm or less, and especially preferably 50 ppm or less.

In the glass substrate according to an embodiment of the present invention, in order to make a thermal conductivity high and to make the meltability satisfactory, it is preferred to contain $Fe_2O_3$ in an amount of more than 200 ppm and 1,000 ppm or less as expressed in terms of parts per million mass based on oxides. When the content of $Fe_2O_3$ is more than 200 ppm, it is possible to make the thermal conductivity of the glass substrate high and to make the meltability satisfactory. When the content of $Fe_2O_3$ is 1,000 ppm or less, absorption of a visible light does not become excessively strong.

The content of $Fe_2O_3$ is more preferably 300 ppm or more, still more preferably 400 ppm or more, and especially preferably 500 ppm or more. The content of $Fe_2O_3$ is more preferably 800 ppm or less, still more preferably 700 ppm or less, and especially preferably 600 ppm or less.

In the glass substrate according to an embodiment of the present invention, for example, $SnO_2$, $SO_3$, Cl, F, or the like may be contained as a refining agent.

In the glass substrate according to an embodiment of the present invention, in order to improve weather resistance, solubility, devitrification properties, ultraviolet shielding, infrared shielding, ultraviolet transmission, infrared transmission, and so on, for example, ZnO, $Li_2O$, $WO_3$, $Nb_2O_5$, $V_2O_5$, $Bi_2O_3$, $MoO_3$, $P_2O_5$, $Ga_2O_3$, $I_2O_5$, $In_2O_5$, $Ge_2O_5$, and the like may be contained.

In the glass substrate according to an embodiment of the present invention, in order to improve the chemical durability of glass, $ZrO_2$, $Y_2O_3$, $La_2O_3$, $TiO_2$, and $SnO_2$ may be contained in an amount of 2% or less, preferably 1% or less, and more preferably 0.5% or less in total in the glass. Among those, $Y_2O_3$, $La_2O_3$, and $TiO_2$ also contribute to an improvement of the Young's modulus of glass.

In the glass substrate according to an embodiment of the present invention, taking into consideration an environmental load, it is preferred that $As_2O_3$ and $Sb_2O_3$ are not substantially contained. In addition, taking into consideration stable float forming, it is preferred that ZnO is not substantially contained.

In the glass substrate according to an embodiment of the present invention, an average thermal expansion coefficient $\alpha_{100/200}$ at 100° C. to 200° C. is preferably 3.13 ppm/° C. to 3.63 ppm/° C., and more preferably 3.23 ppm/° C. to 3.53 ppm/° C. When $\alpha_{100/200}$ falls within the above-described range, since the difference in thermal expansion coefficient from the silicon substrate is small, in the heat treatment step of sticking the silicon substrate and the glass substrate to each other, the residual strain generated in the silicon substrate can be made small while securing a process margin.

$\alpha_{100/200}$ is still more preferably 3.33 ppm/° C. or more, especially preferably 3.34 ppm/° C. or more, and most preferably 3.35 ppm/° C. or more. In addition, $\alpha_{100/200}$ is still more preferably 3.43 ppm/° C. or less, especially preferably 3.41 ppm/° C. or less, and most preferably 3.38 ppm/° C. or less.

The "average thermal expansion coefficient $\alpha_{100/200}$ at 100° C. to 200° C." as referred to herein is an average thermal expansion coefficient as measured by the method prescribed in JIS R3102 (1995), in which a temperature range of measuring the thermal expansion coefficient is 100° C. to 200° C.

In the glass substrate according to an embodiment of the present invention, a Young's modulus thereof is preferably 80 GPa or more. When the Young's modulus is 80 GPa or more, a warpage or cracks of the glass substrate generated in a cooling step on the occasion of producing a glass substrate can be suppressed. In addition, breakage to be caused due to contact with the silicon substrate or peripheral members or the like can be suppressed. The Young's modulus is more preferably 81 GPa or more, still more preferably 82 GPa or more, and especially preferably 84 GPa or more.

In addition, the Young's modulus is preferably 100 GPa or less. When the Young's modulus is 100 GP or less, the glass becomes less-brittle, whereby fracture or chipping at the cutting or dicing process of the glass substrate can be suppressed. The Young's modulus is more preferably 90 GPa or less, and still more preferably 87 GPa or less.

In the glass substrate according to an embodiment of the present invention, a thickness thereof is preferably 1.0 mm or less. When the thickness is 1.0 mm or less, the image sensor can be miniaturized. The thickness is more preferably 0.8 mm or less, still more preferably 0.7 mm or less, and especially preferably 0.5 mm or less.

In the addition, the thickness is preferably 0.1 mm or more. When the thickness is 0.1 mm or more, breakage to be caused due to contact with the silicon substrate or peripheral members or the like can be suppressed. In addition, gravitational sag of the glass substrate can be suppressed. The thickness is more preferably 0.2 mm or more, and still more preferably 0.3 mm or more.

In the glass substrate according to an embodiment of the present invention, an area thereof is preferably 0.03 $m^2$ or more. When the area is 0.03 $m^2$ or more, a silicon substrate having a large area can be used, and a large number of image sensors can be produced from one sheet of laminated substrate. The area is more preferably 0.04 $m^2$ or more, and still more preferably 0.05 $m^2$ or more.

In addition, in the glass substrate according to an embodiment of the present invention, since $\alpha_{200/300}$ is 3.45 ppm/° C. to 3.95 ppm/° C., and $\alpha_{200/300}/\alpha_{50/100}$ is 1.20 to 1.30, even when the area is 0.03 m² or more, the residual strain generated in the silicon substrate in the heat treatment step of sticking the silicon substrate and the glass substrate to each other is small. The area is preferably 0.1 m² or less. When the area is 0.1 m² or less, handling of the glass substrate becomes easy, and breakage to be caused due to contact with the silicon substrate or peripheral members or the like can be suppressed. The area is more preferably 0.08 m² or less, and still more preferably 0.06 m² or less.

In the glass substrate according to an embodiment of the present invention, a density thereof is preferably 2.60 g/cm³ or less. When the density is 2.60 g/cm³ or less, the glass substrate is lightweight. In addition, gravitational sag of the glass substrate can be reduced. The density is more preferably 2.55 g/cm³ or less, and still more preferably 2.50 g/cm³ or less.

In addition, the density is preferably 2.20 g/cm³ or more. When the density is 2.20 g/cm³ or more, a Vickers hardness of the glass becomes high, so that the glass surface can be made to be hardly scratched. The density is more preferably 2.30 g/cm³ or more, still more preferably 2.40 g/cm³ or more, and especially preferably 2.45 g/cm³ or more.

In the glass substrate according to an embodiment of the present invention, a density of defect contained in the glass substrate is preferably one or less per cm². The defect contained in the glass substrate refers to a bubble, a scratch, a metal impurity such as platinum, etc., a residual raw material, and the like existing on the surface or inside of the glass substrate, a size of which is 1 mm or less and 0.5 μm or more. When the defect is larger than 1 mm, it can be easily discriminated through visual inspection, and it is easy to exclude a substrate having a defect. When the defect is smaller than 0.5 μm, since the defects are thoroughly small, even when applied as the cover glass of CMOS sensor or LCOS, there is no concern that such a defect affects characteristics of element.

In the conventional semiconductor assembly process, the assembly process was performed after cutting a glass substrate, and therefore, in the case where the glass substrate involves a defect, the substrate involving such a defect could be excluded at the initial stage. On the other hand, in the wafer-level package, since singulation of the laminated substrate is performed at the very end of the assembly process, in the case where the glass substrate involves a defect, what the glass substrate involving such a defect can be excluded is made at the very end of the assembly process. Thus, in the wafer-level package, in the case where the density of defect of the glass substrate increases, an increase of costs becomes large, and therefore, high-quality control of defect is required. The density of defect is more preferably 0.1 or less per cm², and still more preferably 0.01 or less per cm².

A shape of the glass substrate according to an embodiment of the present invention may be any of a circle, an ellipse, or a rectangle. In order to make the shape of the glass substrate conform to a shape of the silicon substrate, a notch may be provided in an end of the glass substrate, and in the case where the glass substrate is circular, a part of the outer periphery of the glass substrate may be a straight line.

In the glass substrate according to an embodiment of the present invention, a glass transition point (also referred to as Tg) is preferably 700° C. or higher. When Tg is 700° C. or higher, a dimensional change of the glass substrate in the heat treatment step can be suppressed to be small. Tg is more preferably 720° C. or higher, and still more preferably 740° C. or higher.

In the glass substrate according to an embodiment of the present invention, a fictive viscosity thereof is preferably $10^{11.0}$ dPa·sec to $10^{14.1}$ dPa·sec. In order to regulate the fictive viscosity to $10^{11.0}$ dPa·sec to $10^{14.1}$ dPa·sec, it is necessary to make a cooling rate after forming of the glass substrate corresponding to 1° C./min to 1,200° C./min. When the fictive viscosity is $10^{11.0}$ dPa·sec to $10^{14.1}$ dPa·sec, the average thermal expansion coefficient of the glass substrate becomes close to the average thermal expansion coefficient of the silicone substrate, and the residual strain generated in the silicon substrate in the heat treatment step of sticking the silicon substrate and the glass substrate to each other is small. The fictive viscosity of the glass substrate is more preferably $10^{12.1}$ dPa·sec to $10^{13.1}$ dPa·sec (corresponding to a cooling rate of 1° C./min to 1,200° C./min).

The fictive viscosity (η) of the glass can be calculated according to the following equation (4) (G. W. Scherer, "Relaxation in Glass and Composites", Wiley, New York (1986), p. 159).

$$\log_{10} \eta = 12.3 - \log_{10}|q| \quad (4)$$

Here, the unit of η is dPa·sec, and q is an assumed cooling rate, a unit of which is ° C./s.

The assumed cooling rate q is determined from the glass substrate by the following method. Plural small glass pieces are cut out from one sheet of glass substrate having a thickness of 1 mm or less. For example, a small piece of 1 cm square is cut out as the small glass piece. The cut-out plural small glass pieces are respectively heat treated and cooled at various cooling rates V, and physical property values of the respective small glass pieces are measured. A cooling start temperature is preferably a sufficiently high temperature at which any influence is not given by the cooling rate. Typically, the cooling start temperature is preferably approximately (Tg+50° C.) to (Tg+150° C.).

Although the physical property values for carrying out the measurement are not particularly restricted, a density, physical property values in a close relation with the density (for example, a refractive index), and so on are preferred. A calibration curve A is prepared by plotting the cooling rate ($\log_{10}$ V) on the x-axis and plotting the physical property values of the respective heat-treated small glass pieces on the y-axis. From the physical property values of a small glass piece not having been subjected to a heat treatment, the assumed cooling rate q of the glass substrate is determined according to the prepared calibration curve A.

In the glass substrate according to an embodiment of the present invention, a temperature at which the viscosity becomes $10^2$ dPa·sec (also referred to as $T_2$) is preferably 1,800° C. or lower. $T_2$ is more preferably 1,750° C. or lower, still more preferably 1,700° C. or lower, and especially preferably 1,650° C. or lower.

In the glass substrate according to an embodiment of the present invention, a temperature at which the viscosity becomes $10^4$ dPa·sec (also referred to as $T_4$) is preferably 1,350° C. or lower. $T_4$ is more preferably 1,300° C. or lower, still more preferably 1,275° C. or lower, and especially preferably 1,250° C. or lower. Taking into consideration easiness for securing other physical properties, $T_4$ is 1,100° C. or higher.

In the glass substrate according to an embodiment of the present invention, a glass devitrification temperature thereof is preferably 1,325° C. or lower. The glass devitrification temperature is more preferably 1,300° C. or lower, still more preferably 1,275° C. or lower, and especially preferably 1,250° C. or lower. The glass devitrification temperature is one obtained in the following manner. That is, pulverized glass particles are put into a platinum-made dish and heat treated for 17 hours in an electric furnace controlled at a fixed temperature; after the heat treatment, the observation with an optical microscope is performed; and an average value between a maximum temperature at which a crystal is precipitated in the inside of the glass and a minimum temperature at which a crystal is not precipitated is defined as the devitrification temperature.

It is preferred that the glass substrate according to an embodiment of the present invention satisfies the followings:

$\{0.0177\times(\text{content of SiO}_2)-0.0173\times(\text{content of Al}_2\text{O}_3)+0.0377\times(\text{content of B}_2\text{O}_3)+0.0771\times(\text{content of MgO})+0.1543\times(\text{content of CaO})+0.1808\times(\text{content of SrO})+0.2082\times(\text{content of BaO})+0.0344\times(12.3+\log_{10} 60-\log_{10}\eta)\}$ is 2.70 to 3.20;

$\{0.0181\times(\text{content of SiO}_2)+0.0004\times(\text{content of Al}_2\text{O}_3)+0.0387\times(\text{content of B}_2\text{O}_3)+0.0913\times(\text{content of MgO})+0.1621\times(\text{content of CaO})+0.1900\times(\text{content of SrO})+0.2180\times(\text{content of BaO})+0.0391\times(12.3+\log_{10} 60-\log_{10}\eta)\}$ is 3.13 to 3.63;

$\{0.0177\times(\text{content of SiO}_2)+0.0195\times(\text{content of Al}_2\text{O}_3)+0.0323\times(\text{content of B}_2\text{O}_3)+0.1015\times(\text{content of MgO})+0.1686\times(\text{content of CaO})+0.1990\times(\text{content of SrO})+0.2179\times(\text{content of BaO})+0.0312\times(12.3+\log_{10} 60-\log_{10}\eta)\}$ is 3.45 to 3.95; and $\{0.0111\times(\text{content of SiO}_2)+0.0250\times(\text{content of Al}_2\text{O}_3)+0.0078\times(\text{content of B}_2\text{O}_3)+0.0144\times(\text{content of MgO})+0.0053\times(\text{content of CaO})+0.0052\times(\text{content of SrO})+0.0013\times(\text{content of BaO})-0.0041\times(12.3+\log_{10} 60-\log_{10}\eta)\}$ is 1.20 to 1.30.

Here, the content of $SiO_2$, the content of $Al_2O_3$, the content of $B_2O_3$, the content of MgO, the content of CaO, the content of SrO, and the content of BaO are respectively a content of each of the components contained in the resulting glass; and $\eta$ is a fictive viscosity (unit: dPa·sec).

When these are satisfied, in the heat treatment step of sticking the silicon substrate and the glass substrate to each other, the residual strain generated in the silicon substrate can be made small while securing a process margin.

$\{0.0177\times(\text{content of SiO}_2)-0.0173\times(\text{content of Al}_2\text{O}_3)+0.0377\times(\text{content of B}_2\text{O}_3)+0.0771\times(\text{content of MgO})+0.1543\times(\text{content of CaO})+0.1808\times(\text{content of SrO})+0.2082\times(\text{content of BaO})+0.0344\times(12.3+\log_{10} 60-\log_{10}\eta)\}$ is more preferably 2.80 or more, still more preferably 2.90 or more, especially preferably 2.91 or more, and most preferably 2.92 or more.

In addition, $\{0.0177\times(\text{content of SiO}_2)-0.0173\times(\text{content of Al}_2\text{O}_3)+0.0377\times(\text{content of B}_2\text{O}_3)+0.0771\times(\text{content of MgO})+0.1543\times(\text{content of CaO})+0.1808\times(\text{content of SrO})+0.2082\times(\text{content of BaO})+0.0344\times(12.3+\log_{10} 60-\log_{10}\eta)\}$ is more preferably 3.10 or less, still more preferably 3.00 or less, especially preferably 2.96 or less, and most preferably 2.94 or less.

$\{0.0181\times(\text{content of SiO}_2)+0.0004\times(\text{content of Al}_2\text{O}_3)+0.0387\times(\text{content of B}_2\text{O}_3)+0.0913\times(\text{content of MgO})+0.1621\times(\text{content of CaO})+0.1900\times(\text{content of SrO})+0.2180\times(\text{content of BaO})+0.0391\times(12.3+\log_{10} 60-\log_{10}\eta)\}$ is more preferably 3.23 or more, still more preferably 3.33 or more, especially preferably 3.34 or more, and most preferably 3.35 or more.

In addition, $\{0.0181\times(\text{content of SiO}_2)+0.0004\times(\text{content of Al}_2\text{O}_3)+0.0387\times(\text{content of B}_2\text{O}_3)+0.0913\times(\text{content of MgO})+0.1621\times(\text{content of CaO})+0.1900\times(\text{content of SrO})+0.2180\times(\text{content of BaO})+0.0391\times(12.3+\log_{10} 60-\log_{10}\eta)\}$ is more preferably 3.53 or less, still more preferably 3.43 or less, especially preferably 3.41 or less, and most preferably 3.38 or less.

$\{0.0177\times(\text{content of SiO}_2)+0.0195\times(\text{content of Al}_2\text{O}_3)+0.0323\times(\text{content of B}_2\text{O}_3)+0.1015\times(\text{content of MgO})+0.1686\times(\text{content of CaO})+0.1990\times(\text{content of SrO})+0.2179\times(\text{content of BaO})+0.0312\times(12.3+\log_{10} 60-\log_{10}\eta)\}$ is more preferably 3.55 or more, still more preferably 3.65 or more, especially preferably 3.66 or more, and most preferably 3.68 or more.

In addition, $\{0.0177\times(\text{content of SiO}_2)+0.0195\times(\text{content of Al}_2\text{O}_3)+0.0323\times(\text{content of B}_2\text{O}_3)+0.1015\times(\text{content of MgO})+0.1686\times(\text{content of CaO})+0.1990\times(\text{content of SrO})+0.2179\times(\text{content of BaO})+0.0312\times(12.3+\log_{10} 60-\log_{10}\eta)\}$ is more preferably 3.85 or less, still more preferably 3.73 or less, especially preferably 3.71 or less, and most preferably 3.65 or less.

Furthermore, $0.0111\times(\text{content of SiO}_2)+0.0250\times(\text{content of Al}_2\text{O}_3)+0.0078\times(\text{content of B}_2\text{O}_3)+0.0144\times(\text{content of MgO})+0.0053\times(\text{content of CaO})+0.0052\times(\text{content of SrO})+0.0013\times(\text{content of BaO})-0.0041\times(12.3+\log_{10} 60-\log_{10}\eta)\}$ is more preferably 1.24 or more.

In addition, $0.0111\times(\text{content of SiO}_2)+0.0250\times(\text{content of Al}_2\text{O}_3)+0.0078\times(\text{content of B}_2\text{O}_3)+0.0144\times(\text{content of MgO})+0.0053\times(\text{content of CaO})+0.0052\times(\text{content of SrO})+0.0013\times(\text{content of BaO})-0.0041\times(12.3+\log_{10} 60-\log_{10}\eta)\}$ is more preferably 1.27 or less.

In the glass substrate according to an embodiment of the present invention, a weight loss value relative to a hydrofluoric acid aqueous solution (HF) (hereinafter also expressed as "HF weight loss value") is preferably 0.05 $(\text{mg/cm}^2)/\text{min}$ or more and 0.20 $(\text{mg/cm}^2)/\text{min}$ or less. Here, the HF weight loss value means a loss value per unit area and unit time $((\text{mg/cm}^2)/\text{min})$ on the occasion of dipping the glass substrate at 25° C. in a 5 mass % hydrofluoric acid aqueous solution.

There is a case where the glass substrate according to an embodiment of the present invention is, after being stuck to the silicon substrate, installed directly as a part of a device. For example, the glass substrate is installed as a cover glass into a device. In such a case, in order to miniaturize the device, it is preferred to subject the glass substrate to chemical thinning. For that reason, in the glass substrate according to an embodiment of the present invention, it is preferred that a thinning rate is high. As an index of the thinning rate of the glass substrate, the HF weight loss value can be adopted.

When the HF weight loss value is 0.05 $(\text{mg/cm}^2)/\text{min}$ or more, the productivity of the thinning step become satisfactory, and hence, such is preferred. When the HF weight loss value is 0.20 $(\text{mg/cm}^2)/\text{min}$ or less, a failure, such as the matter that an etching depth of the glass substrate as generated in the thinning step becomes heterogeneous, whereby smoothness of the glass substrate surface is impaired, etc., can be prevented from occurring, and hence, such is preferred.

The HF weight loss value is more preferably 0.07 $(\text{mg/cm}^2)/\text{min}$ or more, still more preferably 0.09 $(\text{mg/cm}^2)/\text{min}$ or more, and especially preferably 0.11 $(\text{mg/cm}^2)/\text{min}$ or more. In addition, the HF weight loss value is more preferably 0.18 (mg/cm$^2$)/min or less, still more preferably 0.16 (mg/cm$^2$)/min or less, and especially preferably 0.14 (mg/cm$^2$)/min or less.

In addition, the glass substrate according to an embodiment of the present invention can be applied as a cover glass of a display device for projection application, for example, LCOS. In such a case, when a photoelastic constant of the glass substrate is high, the glass substrate has birefringence due to a stress generated in a packaging step of device or at the time of use of device. As a result, there is a concern that a color change is caused in the light coming into the device, thereby causing an image quality failure, such as color unevenness, etc.

In order to prevent such an image quality failure from occurring, in the glass substrate according to an embodiment of the present invention, a photoelastic constant is preferably 31 nm/(MPa·cm) or less, more preferably 30.5 nm/(MPa·cm) or less, still more preferably 30 nm/(MPa·cm) or less, and especially preferably 29.5 nm/(MPa·cm) or less.

In addition, in the glass substrate according to an embodiment of the present invention, an α-ray emitting quantity is preferably 0.5 C/cm$^2$·h or less, more preferably 0.3 C/cm$^2$·h or less, especially preferably 0.1 C/cm$^2$·h or less, and most preferably 0.05 C/cm$^2$·h or less. The unit C means the count number.

For example, the glass substrate according to an embodiment of the present invention is applied to a cover glass of a device, such as an image sensor, etc. In this case, when an α-ray generated from the glass substrate comes into a device, such as an image sensor, etc., there is a concern that a hole-electron pair is induced by energy of the α-ray, resulting in occurrence of a soft error instantaneously generated in an image, such as a bright spot or a white spot. Then, by using a glass substrate with a small α-ray emitting quantity, such a failure is readily prevented from occurring. When a high-purity raw material with a small content of a radioactive isotope and a small α-ray emitting quantity is used as the raw material of the glass substrate, the α-ray emitting quantity can be decreased. In addition, in the melting/refining step of glass, by making a radioactive isotope not include into the molten glass from a furnace material or the like of glass manufacturing equipment, the α-ray emitting quantity can be effectively decreased. In addition, the "α-ray emitting quantity" can be measured by a gas flow proportional counter measuring apparatus or the like.

An average thermal expansion coefficient $\alpha_{Si50/100}$ at 50° C. to 100° C. of the silicon substrate is preferably 2.91 ppm/° C. to 2.97 ppm/° C. When $\alpha_{Si50/100}$ is 2.91 ppm/° C. to 2.97 ppm/° C., sticking to the glass substrate of the present invention becomes easy. $\alpha_{Si50/100}$ is more preferably 2.92 ppm/° C. or more, and still more preferably 2.93 ppm/° C. or more. In addition, $\alpha_{Si50/100}$ is more preferably 2.94 ppm/° C. or less.

An average thermal expansion coefficient $\alpha_{Si100/200}$ at 100° C. to 200° C. of the silicon substrate is preferably 3.34 ppm/° C. to 3.40 ppm/° C. When $\alpha_{Si100/200}$ is 3.34 ppm/° C. to 3.40 ppm/° C., sticking to the glass substrate of the present invention becomes easy. $\alpha_{Si100/200}$ is more preferably 3.36 ppm/° C. or more, and still more preferably 3.37 ppm/° C. or more. In addition, $\alpha_{Si100/200}$ is more preferably 3.38 ppm/° C. or less.

An average thermal expansion coefficient $\alpha_{Si200/300}$ at 200° C. to 300° C. of the silicon substrate is preferably 3.66 ppm/° C. to 3.72 ppm/° C. When $\alpha_{Si200/300}$ is 3.66 ppm/° C. to 3.72 ppm/° C., sticking to the glass substrate of the present invention becomes easy. $\alpha_{Si200/300}$ is more preferably 3.68 ppm/° C. or more, and still more preferably 3.69 ppm/° C. or more. In addition, $\alpha_{Si200/300}$ is more preferably 3.70 ppm/° C. or less.

The laminated substrate according to an embodiment of the present invention is formed through lamination of the above-described glass substrate and the silicon substrate. Since the difference in thermal expansion coefficient between the silicon substrate and the glass substrate is small, in the heat treatment step of sticking the silicon substrate and the glass substrate to each other, the residual strain generated in the silicon substrate is small. The laminated substrate is obtained by, for example, sticking the glass substrate and the silicon substrate to each other while interposing a resin therebetween.

At this time, the thickness of the resin, the thermal expansion coefficient of the resin, the heat treatment temperature at the time of sticking, and the like may influence a warpage of the whole of the laminated substrate. In the laminated substrate according to an embodiment of the present invention, by controlling the thermal expansion coefficient as in the glass substrate according to an embodiment of the present invention as described above, the warpage of the whole of the laminated substrate can be reduced, and therefore, a process margin, such as the thickness of the resin, the thermal expansion coefficient of the resin, the heat treatment temperature at the time of sticking, etc., can be widened. In the laminated substrate according to an embodiment of the present invention, the above-described glass substrate according to an embodiment of the present invention can be applied.

The laminated substrate according to an embodiment of the present invention is formed through lamination of the glass substrate and the silicon substrate, and a difference $\Delta\alpha_{50/100}$ (=$\alpha_{50/100}$−$\alpha_{Si50/100}$) between the average thermal expansion coefficient $\alpha_{50/100}$ at 50° C. to 100° C. of the glass substrate and the average thermal expansion coefficient $\alpha_{Si50/100}$ at 50° C. to 100° C. of the silicon substrate is −0.25 ppm/° C. to 0.25 ppm/° C.

In addition, a difference $\Delta\alpha_{200/300}$ ($\alpha_{200/300}$−$\alpha_{Si200/300}$) between the average thermal expansion coefficient $\alpha_{200/300}$ at 200° C. to 300° C. of the glass substrate and the average thermal expansion coefficient $\alpha_{Si200/300}$ at 200° C. to 300° C. of the silicon substrate is −0.25 ppm/° C. to 0.25 ppm/° C. Since the difference in thermal expansion coefficient between the silicon substrate and the glass substrate is small, in the heat treatment step of sticking the silicon substrate and the glass substrate to each other, the residual strain generated in the silicon substrate is small.

$\Delta\alpha_{50/100}$ is more preferably −0.15 ppm/° C. or more, still more preferably −0.10 ppm/° C. or more, especially preferably −0.05 ppm/° C. or more, and most preferably −0.03 ppm/° C. or more. $\Delta\alpha_{50/100}$ is more preferably 0.15 ppm/° C. or less, still more preferably 0.10 ppm/° C. or less, especially preferably 0.05 ppm/° C. or less, and most preferably 0.03 ppm/° C. or less.

$\Delta\alpha_{200/300}$ is more preferably −0.15 ppm/° C. or more, still more preferably −0.10 ppm/° C. or more, especially preferably −0.05 ppm/° C. or more, and most preferably −0.03 ppm/° C. or more. $\Delta\alpha_{200/300}$ is more preferably 0.15 ppm/° C. or less, still more preferably 0.10 ppm/° C. or less, especially preferably 0.05 ppm/° C. or less, and most preferably 0.03 ppm/° C. or less.

In the laminated substrate according to an embodiment of the present invention, a difference $\Delta\alpha_{100/200}$ (=$\alpha_{100/200}$−$\alpha_{Si100/200}$) between the average thermal expansion coefficient $\alpha_{100/200}$ at 100° C. to 200° C. of the glass substrate and the average thermal expansion coefficient $\alpha_{Si100/200}$ at 100°

C. to 200° C. of the silicon substrate is preferably −0.25 ppm/° C. to 0.25 ppm/° C. When $\Delta\alpha_{100/200}$ is −0.25 ppm/° C. to 0.25 ppm/° C., since the difference in thermal expansion coefficient between the silicon substrate and the glass substrate is small, in the heat treatment step of sticking the silicon substrate and the glass substrate to each other, the residual strain generated in the silicon substrate is small.

$\Delta\alpha_{100/200}$ is more preferably −0.15 ppm/° C. or more, still more preferably −0.10 ppm/° C. or more, especially preferably −0.05 ppm/° C. or more, and most preferably −0.03 ppm/° C. or more. $\Delta\alpha_{100/200}$ is more preferably 0.15 ppm/° C. or less, still more preferably 0.10 ppm/° C. or less, especially preferably 0.05 ppm/° C. or less, and most preferably 0.03 ppm/° C. or less.

In the laminated substrate according to an embodiment of the present invention, a difference between $\Delta\alpha_{200/300}$ and $\Delta\alpha_{50/100}$ ($\Delta\alpha_{200/300}-\Delta\alpha_{50/100}$) is −0.16 ppm/° C. to 0.16 ppm/° C. When ($\Delta\alpha_{200/300}-\Delta\alpha_{50/100}$) is −0.16 ppm/° C. to 0.16 ppm/° C., since the difference in thermal expansion coefficient from the silicon substrate is small, in the heat treatment step of sticking the silicon substrate and the glass substrate to each other, the residual strain generated in the silicon substrate is small. ($\Delta\alpha_{200/300}-\Delta\alpha_{50/100}$) is preferably −0.12 ppm/° C. or more, and more preferably −0.08 ppm/° C. or more. In addition, ($\Delta\alpha_{200/300}-\Delta\alpha_{50/100}$) is preferably 0.12 ppm/° C. or less, and more preferably 0.08 ppm/° C. or less.

Next, the method for producing a glass substrate according to an embodiment of the present invention is described.

In the case of producing the glass substrate according to an embodiment of the present invention, a melting step of heating glass raw materials to obtain a molten glass, a refining step of removing bubbles from the molten glass, a forming step of forming the molten glass into a sheet-like shape to obtain a glass ribbon, and a cooling step of gradually cooling the glass ribbon to a room temperature state are included.

In the melting step, raw materials are prepared so as to have a composition of a glass sheet to be obtained, and the raw materials are continuously put into a melting furnace and heated preferably to approximately 1,450° C. to 1,650° C. to obtain a molten glass.

For the raw materials, oxides, carbonates, nitrates, hydroxides, halides such as chlorides, and so on can be used. In the case where the melting or refining step includes a step where the molten glass comes into contact with platinum, there is a case where minute platinum particles elute into the molten glass and are included as a impurity into the resulting glass sheet. However, the use of a nitrate raw material brings about an effect for preventing elution of this platinum impurity from occurring.

As the nitrate, strontium nitrate, barium nitrate, magnesium nitrate, calcium nitrate, and so on can be used. Use of strontium nitrate is more preferred. As for the particle size of the raw materials, from raw materials having a large particle diameter of several hundred microns to an extent of not causing an unmelted residue to raw materials having a small particle diameter of several microns to an extent that they are not scattered at the time of shipment of raw materials and are not coagulated as secondary particles can be properly used. It is also possible to use a granulated body. In order to prevent scattering of raw materials from occurring, it is also possible to properly regulate the moisture content of raw materials. Melting conditions, such as β-OH, oxidation-reduction degree or redox of Fe [$Fe^{2+}/(Fe^{2+}+Fe^{3+})$], etc., can be properly regulated and used.

Next, the refining step is a step of removing bubbles from the molten glass obtained in the above-described melting step. As the refining step, a degassing method by means of pressure reduction may be applied. In addition, in the glass substrate in the present invention, $SO_3$ or $SnO_2$ can be used as a refining agent. As the $SO_3$ source, a sulfate of at least one element selected from Al, Mg, Ca, Sr, and Ba is preferred; a sulfate of an alkaline earth metal is more preferred; and above all, $CaSO_4 \cdot 2H_2O$, $SrSO_4$, and $BaSO_4$ are especially preferred because their action to make the bubbles large is remarkable.

As the refining agent in the degassing method by means of pressure reduction, it is preferred to use a halogen, such as Cl, F, etc. As the Cl source, a chloride of at least one element selected from Al, Mg, Ca, Sr, and Ba is preferred; a chloride of an alkaline earth metal is more preferred; and above all, $SrCl_2 \cdot 6H_2O$ and $BaCl_2 \cdot 2H_2O$ are especially preferred because not only their action to make the bubbles large is remarkable, but also their deliquescency is small. As the F source, a fluoride of at least one element selected from Al, Mg, Ca, Sr, and Ba is preferred; a fluoride of an alkaline earth metal is more preferred; and above all, $CaF_2$ is still more preferred because an action to make the solubility of the glass raw materials large is remarkable.

Next, the forming step is a step of forming the molten glass from which bubbles have been removed in the above-described refining step into a sheet-like shape to obtain a glass ribbon. As the forming step, the float process of forming a molten glass into a sheet-like shape by being flown onto a molten metal to obtain a glass ribbon is applied.

Next, the cooling step is a step of gradually cooling the glass ribbon obtained in the above-described forming step to a room temperature state. As for the cooling step, the glass ribbon is gradually cooled to a room temperature state such that an average cooling rate of from a temperature at which the viscosity is $10^{13}$ dPa·sec to a temperature at which the viscosity is $10^{14.5}$ dPa·sec becomes R. After cutting the gradually cooled glass ribbon, the glass substrate is obtained.

In the method for producing a glass substrate according to an embodiment of the present invention, the composition of the resulting glass substrate includes, as expressed in terms of a molar percentage based on oxides:

$SiO_2$: 50% to 75%;
$Al_2O_3$: 6% to 16%;
$B_2O_3$: 0% to 15%;
MgO: 0% to 15%;
CaO: 0% to 13%;
SrO: 0% to 11%; and
BaO: 0% to 9.5%.

The content of the alkali metal oxide is 0% to 0.1%.

In addition, in the method for producing a glass substrate according to an embodiment of the present invention, the composition of the resulting glass substrate and the average cooling rate R (unit: ° C./min) from a temperature at which the viscosity of the glass ribbon in the cooling step is $10^{13}$ dPa·sec to a temperature at which the viscosity thereof is $10^{14.5}$ dPa·sec satisfy the following conditions (1) to (4).

{0.0177×(content of $SiO_2$)−0.0173×(content of $Al_2O_3$)+0.0377×(content of $B_2O_3$)+0.0771×(content of MgO)+0.1543×(content of CaO)+0.1808×(content of SrO)+0.2082×(content of BaO)+0.0344×$\log_{10}$ R} is 2.70 to 3.20.   Condition (1):

{0.0181×(content of $SiO_2$)+0.0004×(content of $Al_2O_3$)+0.0387×(content of $B_2O_3$)+0.0913×(content of MgO)+0.1621×(content of CaO)+

$\{0.1900\times(\text{content of SrO})+0.2180\times(\text{content of BaO})+0.0391\times\log_{10} R\}$ is 3.13 to 3.63.  Condition (2):

$\{0.0177\times(\text{content of SiO}_2)+0.0195\times(\text{content of Al}_2\text{O}_3)+0.0323\times(\text{content of B}_2\text{O}_3)+0.1015\times(\text{content of MgO})+0.1686\times(\text{content of CaO})+0.1990\times(\text{content of SrO})+0.2179\times(\text{content of BaO})+0.0312\times\log_{10} R\}$ is 3.45 to 3.95.  Condition (3):

$0.0111\times(\text{content of SiO}_2)+0.0250\times(\text{content of Al}_2\text{O}_3)+0.0078\times(\text{content of B}_2\text{O}_3)+0.0144\times(\text{content of MgO})+0.0053\times(\text{content of CaO})+0.0052\times(\text{content of SrO})+0.0013\times(\text{content of BaO})-0.0041\times\log_{10} R\}$ is 1.20 to 1.30.  Condition (4):

Preferably, the following conditions (1) to (4) are satisfied.

$\{0.0177\times(\text{content of SiO}_2)-0.0173\times(\text{content of Al}_2\text{O}_3)+0.0377\times(\text{content of B}_2\text{O}_3)+0.0771\times(\text{content of MgO})+0.1543\times(\text{content of CaO})+0.1808\times(\text{content of SrO})+0.2082\times(\text{content of BaO})+0.0344\times\log_{10} R\}$ is 2.80 to 3.10.  Condition (1):

$\{0.0181\times(\text{content of SiO}_2)+0.0004\times(\text{content of Al}_2\text{O}_3)+0.0387\times(\text{content of B}_2\text{O}_3)+0.0913\times(\text{content of MgO})+0.1621\times(\text{content of CaO})+0.1900\times(\text{content of SrO})+0.2180\times(\text{content of BaO})+0.0391\times\log_{10} R\}$ is 3.23 to 3.53.  Condition (2):

$\{0.0177\times(\text{content of SiO}_2)+0.0195\times(\text{content of Al}_2\text{O}_3)+0.0323\times(\text{content of B}_2\text{O}_3)+0.1015\times(\text{content of MgO})+0.1686\times(\text{content of CaO})+0.1990\times(\text{content of SrO})+0.2179\times(\text{content of BaO})+0.0312\times\log_{10} R\}$ is 3.55 to 3.85.  Condition (3):

$0.0111\times(\text{content of SiO}_2)+0.0250\times(\text{content of Al}_2\text{O}_3)+0.0078\times(\text{content of B}_2\text{O}_3)+0.0144\times(\text{content of MgO})+0.0053\times(\text{content of CaO})+0.0052\times(\text{content of SrO})+0.0013\times(\text{content of BaO})-0.0041\times\log_{10} R\}$ is 1.24 to 1.27.  Condition (4):

Here, the content of $SiO_2$, the content of $Al_2O_3$, the content of $B_2O_3$, the content of MgO, the content of CaO, the content of SrO, and the content of BaO are respectively a content of each of the components contained in the resulting glass. When the conditions (1) to (4) are satisfied, it is possible to produce a glass substrate in which the residual strain generated in the silicon substrate in the heat treatment step can be made small.

In the above-described glass substrate according to the present embodiment, since the content of the alkali metal oxide is 0.1% or less, in the heat treatment step of sticking the silicon substrate and the glass substrate to each other, an alkali ion is hardly diffused into the silicon substrate. In addition, since the average thermal expansion coefficient $\alpha_{50/100}$ at 50° C. to 100° C. is 2.70 ppm/° C. to 3.20 ppm/° C., the average thermal expansion coefficient $\alpha_{200/300}$ at 200° C. to 300° C. is 3.45 ppm/° C. to 3.95 ppm/° C., and the value $\alpha_{200/300}/\alpha_{50/100}$ obtained by dividing the average thermal expansion coefficient $\alpha_{200/300}$ at 200° C. to 300° C. by the average thermal expansion coefficient $\alpha_{50/100}$ at 50° C. to 100° C. is 1.20 to 1.30, the difference in thermal expansion coefficient from the silicon substrate is small, and the residual strain generated in the silicon substrate is small.

The present invention is not limited to the above-described embodiments. Modifications, improvements, and the like within the range where the object of the present invention can be achieved are included in the present invention.

For example, in the case of producing a glass substrate according to an embodiment of the present invention, in the forming step, the molten glass may be formed into a sheet-like shape by applying the fusion process, the press forming process, or the like.

In addition, in the case of producing a glass substrate according to an embodiment of the present invention, a platinum crucible may be used. In the case of using a platinum crucible, in the melting step, raw materials are prepared so as to have a composition of a glass substrate to be obtained; a platinum crucible having the raw materials charged therein is put into an electric furnace and heated preferably to approximately 1,450° C. to 1,650° C.; a platinum stirrer is inserted; and stirring is performed for 1 to 3 hours to obtain a molten glass.

In the forming step, the molten glass is flown onto a carbon sheet to form a glass sheet. In the cooling step, the glass in a sheet form is gradually cooled to a room temperature state and then cut, thereby forming a glass substrate.

In addition, the glass substrate obtained after cutting may be heated to, for example, approximately (Tg+50° C.), followed by gradually cooling to a room temperature state. According to this way, the fictive viscosity η can be regulated.

The following modes are also included in the present embodiment.

Appendix 1

A glass substrate having:
an average thermal expansion coefficient $\alpha_{50/100}$ at 50° C. to 100° C. of 2.80 ppm/° C. to 3.10 ppm/° C.;
an average thermal expansion coefficient $\alpha_{200/300}$ at 200° C. to 300° C. of 3.55 ppm/° C. to 3.85 ppm/° C.;
a value $\alpha_{200/300}/\alpha_{50/100}$ obtained by dividing the average thermal expansion coefficient $\alpha_{200/300}$ at 200° C. to 300° C. by the average thermal expansion coefficient $\alpha_{50/100}$ at 50° C. to 100° C. of 1.20 to 1.30; and
a content of an alkali metal oxide being 0% to 0.1% as expressed in terms of a molar percentage based on oxides.

Appendix 2

The glass substrate as set forth in Appendix 1, having a composition including, as expressed in terms of a molar percentage based on oxides:
$SiO_2$: 50% to 75%;
$Al_2O_3$: 6% to 16%;
$B_2O_3$: 0% to 15%;
MgO: 0% to 15%;
CaO: 0% to 13%;
SrO: 0% to 11%; and
BaO: 0% to 9.5%.

Appendix 3

The glass substrate as set forth in Appendix 1 or 2, in which a total content of CaO, SrO, and BaO is 7% or more as expressed in terms of a molar percentage based on oxides; a relation of $\{(\text{content of Al}_2\text{O}_3)\geq(\text{content of MgO})\}$ is satisfied; and a devitrification viscosity is $10^{3.8}$ dPa·sec or more.

Appendix 4

The glass substrate as set forth in any one of Appendixes 1 to 3, having an average thermal expansion coefficient $\alpha_{100/200}$ at 100° C. to 200° C. of 3.23 ppm/° C. to 3.53 ppm/° C.

Appendix 5

The glass substrate as set forth in any one of Appendixes 1 to 4, having a content of $Fe_2O_3$ being 200 ppm or less as expressed in terms of parts per million mass based on oxides.

Appendix 6

The glass substrate as set forth in any one of Appendixes 1 to 5, having a Young's modulus of 80 GPa or more.

Appendix 7

The glass substrate as set forth in any one of Appendixes 1 to 6, having a thickness of 1.0 mm or less.

Appendix 8

The glass substrate as set forth in any one of Appendixes 1 to 7, having an area of 0.03 m² or more.

Appendix 9

The glass substrate as set forth in any one of Appendixes 1 to 8, having a fictive viscosity is $10^{11.0}$ to $10^{14.1}$ dPa·sec.

Appendix 10

The glass substrate as set forth in any one of Appendixes 1 to 10, in which:

{0.0177×(content of $SiO_2$)−0.0173×(content of $Al_2O_3$)+0.0377×(content of $B_2O_3$)+0.0771× (content of MgO)+0.1543×(content of CaO)+ 0.1808×(content of SrO)+0.2082×(content of BaO)+0.0344×(12.3+$\log_{10}$ 60−$\log_{10}$ η)} is 2.80 to 3.10;

{0.0181×(content of $SiO_2$)+0.0004×(content of $Al_2O_3$)+0.0387×(content of $B_2O_3$)+0.0913× (content of MgO)+0.1621×(content of CaO)+ 0.1900×(content of SrO)+0.2180×(content of BaO)+0.0391×(12.3+$\log_{10}$ 60−$\log_{10}$ η)} is 3.23 to 3.53;

{0.0177×(content of $SiO_2$)+0.0195×(content of $Al_2O_3$)+0.0323×(content of $B_2O_3$)+0.1015× (content of MgO)+0.1686×(content of CaO)+ 0.1990×(content of SrO)+0.2179×(content of BaO)+0.0312×(12.3+$\log_{10}$ 60−$\log_{10}$ η)} is 3.55 to 3.85; and {0.0111×(content of $SiO_2$)+0.0250×(content of $Al_2O_3$)+0.0078×(content of $B_2O_3$)+0.0144× (content of MgO)+0.0053×(content of CaO)+ 0.0052×(content of SrO)+0.0013×(content of BaO)−0.0041×(12.3+$\log_{10}$ 60−$\log_{10}$ η)} is 1.24 to 1.27.

Here, the content of $SiO_2$, the content of $Al_2O_3$, the content of $B_2O_3$, the content of MgO, the content of CaO, the content of SrO, and the content of BaO are respectively a content of each of the components contained in the resulting glass as expressed in terms of a molar percentage based on oxides; and η is a fictive viscosity (unit: dPa·sec).

Appendix 11

A laminated substrate including: the glass substrate as set forth in any one of Appendixes 1 to 10; and a silicon substrate laminated on the glass substrate.

Appendix 12

A laminated substrate including: a glass substrate; and a silicon substrate laminated on the glass substrate, a difference $\Delta\alpha_{50/100}$ ($=\alpha_{50/100}-\alpha_{Si50/100}$) between an average thermal expansion coefficient $\alpha_{50/100}$ at 50° C. to 100° C. of the glass substrate and an average thermal expansion coefficient $\alpha_{Si50/100}$ at 50° C. to 100° C. of the silicon substrate is −0.15 ppm/° C. to 0.15 ppm/° C.;

a difference $\Delta\alpha_{200/300}$ ($=\alpha_{200/300}-\alpha_{Si200/300}$) between an average thermal expansion coefficient $\alpha_{200/300}$ at 200° C. to 300° C. of the glass substrate and an average thermal expansion coefficient $\alpha_{Si200/300}$ at 200° C. to 300° C. of the silicon substrate is −0.15 ppm/° C. to 0.15 ppm/° C.;

($\Delta\alpha_{200/300}-\Delta\alpha_{50/100}$) is −0.12 ppm/° C. to 0.12 ppm/° C.; and a content of an alkali metal oxide in the glass substrate is 0% to 0.1% as expressed in terms of a molar percentage based on oxides.

Appendix 13

The laminated substrate as set forth in Appendix 12, in which a difference $\Delta\alpha_{100/200}$ ($=\alpha_{100/200}-\alpha_{Si100/200}$) between an average thermal expansion coefficient $\alpha_{100/200}$ at 100° C. to 200° C. of the glass substrate and an average thermal expansion coefficient $\alpha_{Si100/200}$ at 100° C. to 200° C. of the silicon substrate is −0.15 ppm/° C. to 0.15 ppm/° C.

Appendix 14

A method for producing a glass substrate, the method including:

a melting step of heating glass raw materials to obtain a molten glass;

a refining step of removing bubbles from the molten glass;

a forming step of forming the molten glass into a sheet-like shape to obtain a glass ribbon; and a cooling step of gradually cooling the glass ribbon to a room temperature state, in which the resulting glass substrate has a composition including, as expressed in terms of a molar percentage based on oxides:

$SiO_2$: 50% to 75%;
$Al_2O_3$: 6% to 16%;
$B_2O_3$: 0% to 15%;
MgO: 0% to 15%;
CaO: 0% to 13%;
SrO: 0% to 11%; and
BaO: 0% to 9.5%, a content of an alkali metal oxide is 0% to 0.1% as expressed in terms of a molar percentage based on oxides, and the composition of the resulting glass substrate and an average cooling rate R (unit: ° C./min) from a temperature at which a viscosity of the glass ribbon in the cooling step is $10^{13}$ dPa·sec to a temperature at which the viscosity thereof is $10^{14.5}$ dPa·sec satisfy the following condition (1), condition (2), condition (3), and condition (4):

Condition (1): {0.0177×(content of $SiO_2$)−0.0173×(content of $Al_2O_3$)+0.0377×(content of $B_2O_3$)+0.0771× (content of MgO)+0.1543×(content of CaO)+ 0.1808×(content of SrO)+0.2082×(content of BaO)+0.0344×$\log_{10}$ R} is 2.80 to 3.10;

{0.0181×(content of $SiO_2$)+0.0004×(content of $Al_2O_3$)+0.0387×(content of $B_2O_3$)+0.0913× (content of MgO)+0.1621×(content of CaO)+

0.1900×(content of SrO)+0.2180×(content of BaO)+0.0391×log$_{10}$ R} is 3.23 to 3.53;     Condition (2):

{0.0177×(content of SiO$_2$)+0.0195×(content of Al$_2$O$_3$)+0.0323×(content of B$_2$O$_3$)+0.1015× (content of MgO)+0.1686×(content of CaO)+ 0.1990×(content of SrO)+0.2179×(content of BaO)+0.0312×log$_{10}$ R} is 3.55 to 3.85; and     Condition (3):

0.0111×(content of SiO$_2$)+0.0250×(content of Al$_2$O$_3$)+0.0078×(content of B$_2$O$_3$)+0.0144× (content of MgO)+0.0053×(content of CaO)+ 0.0052×(content of SrO)+0.0013×(content of BaO)−0.0041×log$_{10}$ R} is 1.24 to 1.27.     Condition (4):

Here, the content of SiO$_2$, the content of Al$_2$O$_3$, the content of B$_2$O$_3$, the content of MgO, the content of CaO, the content of SrO, and the content of BaO are respectively a content of each of the components contained in the resulting glass.

In the glass substrate, the glass substrate obtained by the method for producing a glass substrate, and the laminated substrate using the glass substrate as described in the Appendixes, since the difference in thermal expansion coefficient between the glass substrate and the silicon substrate is thoroughly small, the failures to be caused due to the difference in thermal expansion coefficient can be more suppressed.

EXAMPLES

The present invention is hereunder specifically described by reference to the Examples, but it should be construed that the present invention is not limited thereto.

Various glass raw materials, such as silica sand, etc., were compounded so as to have a glass composition as shown in each of Tables 1 to 7, 0.1% to 1% of a sulfate as converted into SO$_3$, 0.16% of F, and 1% of Cl as expressed in terms of a molar percentage based on oxides relative to 100% of the raw materials of the objective composition were added, and the contents were melted for 3 hours under heating at a temperature of 1,550° C. to 1,650° C. by using a platinum crucible. In the melting, a platinum stirrer was inserted, and stirring was performed for 1 hour to achieve homogenization of glass. Subsequently, the molten glass was flown out and formed into a sheet-like shape; thereafter, the glass in a sheet-like shape was put into an electric furnace at a temperature of approximately (Tg+50° C.); and the electric furnace was subjected to temperature decrease at a cooling rate R (° C./min) and cooled until the glass reached room temperature.

With respect to the resulting glasses, a density (unit: g/cm$^3$), an average thermal expansion coefficient (unit: ppm/° C.), a glass transition point Tg (unit: ° C.), a Young's modulus (unit: GPa), T$_2$ (unit: ° C.), T$_4$ (unit: ° C.), a devitrification temperature (unit: ° C.), a devitrification viscosity log$_{10}$ η$_{TL}$ (unit: dPa·sec), and a fictive viscosity log$_{10}$ η (unit: dPa·sec) were measured and shown in Tables 1 to 7. In addition, (1) to (4) shown in Tables 1 to 7 are as follows.

0.0177×(content of SiO$_2$)−0.0173×(content of Al$_2$O$_3$)+0.0377×(content of B$_2$O$_3$)+0.0771× (content of MgO)+0.1543×(content of CaO)+ 0.1808×(content of SrO)+0.2082×(content of BaO)+0.0344×(12.3+log$_{10}$ 60−log$_{10}$ η)     (1):

0.0181×(content of SiO$_2$)+0.0004×(content of Al$_2$O$_3$)+0.0387×(content of B$_2$O$_3$)+0.0913× (content of MgO)+0.1621×(content of CaO)+ 0.1900×(content of SrO)+0.2180×(content of BaO)+0.0391×(12.3+log$_{10}$ 60−log$_{10}$ η)     (2)

0.0177×(content of SiO$_2$)+0.0195×(content of Al$_2$O$_3$)+0.0323×(content of B$_2$O$_3$)+0.1015× (content of MgO)+0.1686×(content of CaO)+ 0.1990×(content of SrO)+0.2179×(content of BaO)+0.0312×(12.3+log$_{10}$ 60−log$_{10}$ η)     (3):

0.0111×(content of SiO$_2$)+0.0250×(content of Al$_2$O$_3$)+0.0078×(content of B$_2$O$_3$)+0.0144× (content of MgO)+0.0053×(content of CaO)+ 0.0052×(content of SrO)+0.0013×(content of BaO)−0.0041×(12.3+log$_{10}$ 60−log$_{10}$ η)     (4):

The values in the parentheses in the tables are those determined through calculations. The residual amount of Fe$_2$O$_3$ in the glass was 50 ppm to 200 ppm as expressed in terms of parts per million mass based on oxides, and the residual amount of SO$_3$ in the glass was 10 ppm to 100 ppm as expressed in terms of parts per million mass based on oxides. Measurement methods of respective physical properties are shown as follows.

(Average Thermal Expansion Coefficient)

The average thermal expansion coefficient was measured with a differential thermal expansion meter (TMA) in accordance with the method prescribed in JIS R3102 (1995). The measurement temperature range of α$_{50}$/α$_{100}$ is from 50° C. to 100° C., the measurement temperature range of α$_{100}$/α$_{200}$ is from 100° C. to 200° C., and the measurement temperature range of α$_{200}$/α$_{300}$ is from 200° C. to 300° C.

(Difference in Average Thermal Expansion Coefficient from Silicon Substrate)

With respect to a silicon substrate (manufactured by Shin-Etsu Chemical Co., Ltd.), average thermal expansion coefficients α$_{Si50/100}$, α$_{Si100/200}$, and α$_{Si200/300}$ were measured, and respective differences in average thermal expansion coefficient Δα$_{50/100}$, Δα$_{100/200}$, and Δα$_{200/300}$ from the glass substrate were determined. Here, Δα$_{50/100}$, Δα$_{100/200}$, and Δα$_{200/300}$ are as follows.

$$\Delta\alpha_{50/100} = \alpha_{50/100} - \alpha_{Si50/100}$$

$$\Delta\alpha_{100/200} = \alpha_{100/200} - \alpha_{Si100/200}$$

$$\Delta\alpha_{200/300} = \alpha_{200/300} - \alpha_{Si200/300}$$

The average thermal expansion coefficients α$_{Si50/100}$, α$_{Si100/200}$, and α$_{Si200/300}$ of the silicon substrate were 2.94 ppm/° C., 3.37 ppm/° C., and 3.69 ppm/° C., respectively.

(Glass Transition Point Tg)

The measurement was performed with TMA in accordance with the method prescribed in JIS R3103-3 (2001).

(Density)

About 20 g of a bubble-free glass lump was measured by the Archimedean method.

(Young's Modulus)

A glass having a thickness of 0.5 mm to 10 mm was measured by the ultrasonic pulse method.

(T$_2$)

A viscosity was measured with a rotary viscometer, and a temperature T$_2$ (° C.) at which the viscosity reached 10$^2$ dPa·sec was measured.

(T$_4$)

A viscosity was measured with a rotary viscometer, and a temperature T$_4$ (° C.) at which the viscosity reached 10$^4$ dPa·sec was measured.

(Glass Devitrification Temperature)

The glass devitrification temperature is one obtained in the following manner. That is, pulverized glass particles are put in a platinum-made dish and heat treated for 17 hours in an electric furnace controlled at a fixed temperature; after the heat treatment, the observation with an optical microscope is performed; and an average value between a maximum temperature at which a crystal is precipitated in the inside of the glass and a minimum temperature at which a crystal is not precipitated is defined as the devitrification temperature.

(Devitrification Viscosity)

A coefficient of the Fulcher's equation was determined from the measurement results of glass viscosity of the molten glass at high temperatures (1,000° C. to 1,600° C.) by using a rotary viscometer, and the glass viscosity at the glass devitrification temperature was determined from the Fulcher's equation using the coefficient.

(HF Weight Loss Value)

The HF weight loss value was measured in the following manner. A glass sheet obtained above was cut, and the both surfaces thereof were subjected to mirror polishing to obtain a glass sample of 40 mm in square and having a thickness of 1 mm. This glass sample was cleaned and then dried, and a weight thereof was measured. Subsequently, the glass sample was dipped in a 5 mass % hydrofluoric acid kept at 25° C. for 20 minutes, cleaned, and then dried. The weight after dipping was measured, and the weight loss value was calculated from the weight before dipping. If a chemical liquid is stirred during dipping, an etching rate fluctuates. Therefore, stirring was not carried out. A surface area was calculated from the sample dimensions, and the weight loss value was divided by the surface area and further divided by the dipping time, thereby determining the weight loss value (HF weight loss value) per unit area and unit time.

(Photoelastic Constant)

The measurement was performed by the circular plate compression method ("Measurement of Photoelastic Constant of Glass for Chemical Strengthening by Method of Compression on Circular Plate", Ryosuke Yokota, Journal of Ceramic Society of Japan, 87[10], 1979, p. 519-522).

TABLE 1

| | | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|---|
| Composition (mol %) | $SiO_2$ | 70.0 | 65.9 | 68.0 | 68.0 | 68.0 | 66.8 | 66.7 | 68.0 | 64.4 | 66.6 | 72.0 | 69.9 | 69.0 |
| | $Al_2O_3$ | 12.0 | 12.9 | 13.0 | 13.0 | 13.0 | 13.0 | 12.9 | 12.5 | 13.0 | 12.9 | 13.5 | 10.3 | 11.0 |
| | $B_2O_3$ | 2.4 | 6.2 | 4.7 | 5.8 | 6.4 | 4.6 | 4.4 | 4.0 | 8.5 | 5.6 | 0.0 | 1.5 | 2.2 |
| | MgO | 8.0 | 8.0 | 6.0 | 4.2 | 3.6 | 8.0 | 9.0 | 8.0 | 7.1 | 7.7 | 6.0 | 13.0 | 12.0 |
| | CaO | 5.6 | 4.0 | 5.3 | 5.0 | 5.0 | 6.6 | 6.0 | 6.5 | 4.0 | 6.2 | 5.5 | 5.3 | 5.8 |
| | SrO | 2.0 | 3.0 | 3.0 | 4.0 | 4.0 | 1.0 | 1.0 | 1.0 | 3.0 | 1.0 | 1.0 | 0.0 | 0.0 |
| | BaO | 0.0 | 0.0 | 0.0 | 0.0 | 0.0 | 0.0 | 0.0 | 0.0 | 0.0 | 0.0 | 2.0 | 0.0 | 0.0 |
| | ZnO | 0 | 0.0 | 0.0 | 0.0 | 0.0 | 0.0 | 0.0 | 0.0 | 0.0 | 0.0 | 0.0 | 0.0 | 0.0 |
| | CaO + SrO + BaO | 7.6 | 7.0 | 8.3 | 9.0 | 9.0 | 7.6 | 7.0 | 7.5 | 7.0 | 7.2 | 8.5 | 5.3 | 5.8 |
| Cooling rate (° C./min) | | 1 | 1 | 1 | 1 | 1 | 1 | 1 | 1 | 1 | 1 | 1 | 1 | 1 |
| Average thermal expansion coefficient (ppm/° C.) | $\alpha_{50/100}$ | 2.91 | 2.95 | 2.97 | 2.91 | 3.00 | 2.91 | 2.94 | | | 2.89 | | | |
| | $\alpha_{100/200}$ | 3.35 | 3.36 | 3.39 | 3.36 | 3.38 | 3.38 | 3.37 | | | 3.32 | | | |
| | $\alpha_{200/300}$ | 3.69 | 3.66 | 3.70 | 3.68 | 3.67 | 3.69 | 3.66 | | | 3.64 | | | |
| $\alpha_{200/300}/\alpha_{50/100}$ | | 1.27 | 1.24 | 1.25 | 1.26 | 1.22 | 1.27 | 1.25 | | | 1.26 | | | |
| Difference in average thermal expansion coefficient from silicon substrate (ppm/° C.) | $\Delta\alpha_{50/100}$ | −0.04 | 0.01 | 0.03 | −0.03 | 0.06 | −0.03 | −0.01 | | | −0.06 | | | |
| | $\Delta\alpha_{100/200}$ | −0.02 | 0.00 | 0.02 | −0.01 | 0.01 | 0.01 | 0.00 | | | −0.05 | | | |
| | $\Delta\alpha_{200/300}$ | 0.00 | −0.03 | 0.01 | −0.01 | −0.02 | 0.00 | −0.03 | | | −0.05 | | | |
| $\Delta\alpha_{200/300} - \Delta\alpha_{50/100}$ | | 0.04 | −0.04 | −0.01 | 0.02 | −0.08 | 0.03 | −0.02 | | | 0.01 | | | |
| Fictive viscosity $\log_{10}\eta$ (dPa · sec) | | 14.1 | 14.1 | 14.1 | 14.1 | 14.1 | 14.1 | 14.1 | 14.1 | 14.1 | 14.1 | 14.1 | 14.1 | 14.1 |
| (1) | | 2.97 | 2.96 | 2.98 | 3.01 | 2.99 | 2.95 | 2.92 | 2.94 | 2.95 | 2.90 | 2.95 | 2.94 | 2.94 |
| (2) | | 3.39 | 3.39 | 3.39 | 3.41 | 3.38 | 3.38 | 3.37 | 3.36 | 3.37 | 3.33 | 3.37 | 3.38 | 3.38 |
| (3) | | 3.71 | 3.71 | 3.71 | 3.71 | 3.67 | 3.71 | 3.70 | 3.68 | 3.66 | 3.64 | 3.71 | 3.70 | 3.70 |
| (4) | | 1.25 | 1.25 | 1.25 | 1.23 | 1.23 | 1.26 | 1.25 | 1.25 | 1.25 | 1.25 | 1.26 | 1.26 | 1.26 |
| Density (g/cm³) | | (2.49) | (2.49) | (2.49) | (2.49) | (2.48) | 2.47 | (2.48) | (2.47) | (2.47) | (2.47) | (2.55) | (2.48) | (2.48) |
| Glass transition point Tg (° C.) | | 768 | 746 | 754 | 747 | 746 | 754 | 753 | (758) | 737 | 760 | (806) | (767) | (763) |
| Young's modulus (GPa) | | (84.2) | (80.6) | (81.1) | (78.4) | (77.5) | 84.6 | (84.1) | (83.5) | 80.6 | 84.1 | (85.4) | (87.4) | (86.6) |
| $T_2$ (° C.) | | 1704 | (1643) | (1680) | (1689) | (1691) | 1647 | (1647) | (1669) | (1628) | (1653) | (1745) | (1671) | (1663) |
| $T_4$ (° C.) | | 1334 | (1279) | (1308) | (1312) | (1312) | 1295 | (1284) | (1298) | (1262) | (1284) | (1366) | (1296) | (1292) |
| Devitrification temperature (° C.) | | 1310 | 1295 | 1285 | 1295 | 1295 | 1305 | 1285 | | | | | | |
| Devitrification viscosity $\log_{10}\eta_{TL}$ (dPa · sec) | | 4.1 | 3.9 | 4.2 | 4.1 | 4.1 | 3.9 | 4.0 | | | | | | |
| HF weight loss value ((mg/cm²)/min) | | (0.10) | (0.15) | (0.12) | (0.13) | (0.12) | 0.13 | (0.14) | (0.12) | 0.13 | 0.11 | (0.09) | (0.10) | (0.11) |
| Photoelastic constant (nm/(MPa · cm)) | | (28.9) | (30.1) | (29.8) | (30.6) | (30.9) | 28.9 | (29.3) | (29.5) | (31.2) | (30.1) | (27.4) | (28.3) | (28.6) |

TABLE 2

| | | Example 14 | Example 15 | Example 16 | Example 17 | Example 18 | Example 19 | Example 20 | Example 21 | Example 22 | Example 23 | Example 24 | Example 25 | Example 26 |
|---|---|---|---|---|---|---|---|---|---|---|---|---|---|---|
| Composition (mol %) | $SiO_2$ | 68.0 | 67.1 | 66.3 | 65.4 | 68.1 | 68.4 | 67.5 | 75.0 | 56.0 | 73.9 | 75.0 | 58.2 | 75.0 |
| | $Al_2O_3$ | 11.6 | 12.2 | 12.9 | 13.5 | 11.8 | 12.5 | 12.0 | 11.8 | 15.0 | 16.0 | 6.0 | 12.0 | 6.3 |
| | $B_2O_3$ | 3.1 | 3.8 | 4.6 | 5.4 | 7.5 | 8.0 | 7.5 | 0.0 | 13.0 | 0.0 | 0.7 | 15.0 | 0.0 |
| | MgO | 11.0 | 10.0 | 9.0 | 8.0 | 3.0 | 1.5 | 5.2 | 6.2 | 10.0 | 0.0 | 15.0 | 9.8 | 15.0 |
| | CaO | 6.3 | 6.8 | 7.2 | 7.7 | 9.1 | 5.0 | 5.0 | 0.0 | 6.0 | 0.0 | 0.1 | 3.0 | 0.3 |
| | SrO | 0.0 | 0.0 | 0.0 | 0.0 | 0.5 | 4.3 | 1.0 | 7.1 | 0.0 | 9.8 | 3.1 | 2.0 | 3.3 |
| | BaO | 0.0 | 0.0 | 0.0 | 0.0 | 0.0 | 0.3 | 1.8 | 0.0 | 0.0 | 0.3 | 0.0 | 0.0 | 0.3 |
| | ZnO | 0.0 | 0.0 | 0.0 | 0.0 | 0.0 | 0.0 | 0.0 | 0.0 | 0.0 | 0.0 | 0.0 | 0.0 | 0.2 |
| | CaO + SrO + BaO | 6.3 | 6.8 | 7.2 | 7.7 | 9.6 | 9.6 | 7.8 | 7.1 | 6.0 | 10.1 | 3.3 | 5.0 | 3.7 |
| Cooling rate (° C./min) | | 1 | 1 | 1 | 1 | 1 | 1 | 1 | 1 | 1 | 1 | 1 | 1 | 1 |
| Average thermal expansion coefficient (ppm/° C.) | $\alpha_{50/100}$ | | | | | | | | | | | | | |
| | $\alpha_{100/200}$ | | | | | | | | | | | | | |
| | $\alpha_{200/300}$ | | | | | | | | | | | | | |
| Difference in average thermal expansion coefficient from silicon substrate (ppm/° C.) | $\Delta\alpha_{50/100}$ | | | | | | | | | | | | | |
| | $\Delta\alpha_{100/200}$ | | | | | | | | | | | | | |
| | $\Delta\alpha_{200/300}$ | | | | | | | | | | | | | |
| $\Delta\alpha_{200/300}$-$\Delta\alpha_{50/100}$ | | | | | | | | | | | | | | |
| Fictive viscosity $\log_{10}\eta$ (dPa · sec) | | 14.1 | 14.1 | 14.1 | 14.1 | 14.1 | 14.1 | 14.1 | 14.1 | 14.1 | 14.1 | 14.1 | 14.1 | 14.1 |
| (1) | | 2.94 | 2.94 | 2.94 | 2.93 | 3.01 | 3.02 | 2.99 | 2.88 | 2.92 | 2.86 | 2.99 | 2.97 | 3.04 |
| (2) | | 3.38 | 3.38 | 3.38 | 3.38 | 3.38 | 3.37 | 3.38 | 3.27 | 3.41 | 3.27 | 3.37 | 3.40 | 3.43 |
| (3) | | 3.71 | 3.71 | 3.71 | 3.71 | 3.62 | 3.62 | 3.63 | 3.59 | 3.73 | 3.63 | 3.64 | 3.65 | 3.71 |
| (4) | | 1.26 | 1.26 | 1.26 | 1.26 | 1.20 | 1.21 | 1.22 | 1.25 | 1.27 | 1.27 | 1.22 | 1.23 | 1.22 |
| Density (g/cm³) | | (2.47) | (2.47) | (2.47) | (2.47) | (2.42) | (2.47) | (2.48) | (2.54) | (2.45) | (2.60) | (2.48) | (2.43) | (2.50) |
| Glass transition point Tg (° C.) | | (759) | (756) | (753) | (750) | (728) | (728) | (728) | (796) | (680) | (822) | (751) | (647) | (759) |
| Young's modulus (GPa) | | (85.9) | (85.2) | (84.5) | (83.7) | (77.0) | (73.7) | (76.3) | (81.9) | (78.6) | (80.7) | (83.2) | (72.4) | (84.1) |
| $T_2$ (° C.) | | (1655) | (1648) | (1641) | (1633) | (1690) | (1709) | (1687) | (1778) | (1502) | (1797) | (1732) | (1534) | (1733) |
| $T_4$ (° C.) | | (1287) | (1282) | (1278) | (1274) | (1298) | (1317) | (1298) | (1386) | (1170) | (1420) | (1325) | (1175) | (1329) |
| Devitrification temperature (° C.) | | | | | | | | | | | | | | |
| Devitrification viscosity $\log_{10}\eta_{TL}$ (dPa · sec) | | | | | | | | | | | | | | |
| HF weight loss value ((mg/cm²)/min) | | (0.12) | (0.13) | (0.14) | (0.15) | (0.12) | (0.11) | (0.13) | (0.04) | (0.26) | (0.06) | (0.02) | (0.22) | (0.03) |
| Photoelastic constant (nm/(MPa · cm) | | (28.9) | (29.1) | (29.4) | (29.7) | (32.1) | (32.1) | (31.1) | (28.5) | (31.7) | (27.9) | (29.1) | (33.6) | (28.6) |

TABLE 3

| | | Example 27 | Example 28 | Example 29 | Example 30 | Example 31 | Example 32 | Example 33 | Example 34 | Example 35 | Example 36 | Example 37 | Example 38 | Example 39 |
|---|---|---|---|---|---|---|---|---|---|---|---|---|---|---|
| Composition (mol %) | $SiO_2$ | 60.4 | 64.5 | 71.6 | 65.8 | 74.2 | 75.0 | 74.4 | 73.4 | 66.3 | 66.9 | 66.3 | 70.6 | 71.4 |
| | $Al_2O_3$ | 12.4 | 16.0 | 15.2 | 16.0 | 14.8 | 14.7 | 16.0 | 13.7 | 14.2 | 14.2 | 14.2 | 12.0 | 12.0 |
| | $B_2O_3$ | 8.4 | 9.2 | 0.0 | 9.2 | 0.0 | 1.0 | 0.0 | 1.2 | 6.0 | 5.2 | 5.5 | 1.3 | 1.6 |
| | MgO | 15.0 | 0.0 | 0.0 | 0.0 | 0.0 | 0.4 | 0.0 | 2.2 | 4.9 | 5.0 | 5.0 | 8.0 | 6.0 |
| | CaO | 2.4 | 4.6 | 13.2 | 0.0 | 0.0 | 0.7 | 0.0 | 4.3 | 5.0 | 6.3 | 8.0 | 8.0 | 9.0 |
| | SrO | 1.3 | 2.5 | 0.0 | 2.5 | 11.0 | 0.0 | 0.0 | 5.2 | 3.5 | 2.0 | 1.0 | 0.0 | 0.0 |
| | BaO | 0.1 | 3.2 | 0.0 | 6.5 | 0.0 | 8.2 | 9.6 | 0.0 | 0.0 | 0.4 | 0.0 | 0.0 | 0.0 |
| | ZnO | 0.0 | 0.0 | 0.0 | 0.0 | 0.0 | 0.0 | 0.0 | 0.0 | | | | | |
| | CaO + SrO + BaO | 3.8 | 10.3 | 13.2 | 9.0 | 11.0 | 8.9 | 9.6 | 9.5 | 8.5 | 8.8 | 9.1 | 8.0 | 9.0 |
| Cooling rate (° C./min) | | 1 | 1 | 1 | 1 | 1 | 1 | 1 | 1 | 1 | 1 | 1 | 1 | 1 |
| Average thermal expansion coefficient (ppm/° C.) | $\alpha_{50/100}$ | | | | | | | | | | | | | |
| | $\alpha_{100/200}$ | | | | | | | | | | | | | |
| | $\alpha_{200/300}$ | | | | | | | | | | | | | |
| Difference in average thermal expansion coefficient from silicon substrate (ppm/° C.) | $\Delta\alpha_{50/100}$ | | | | | | | | | | | | | |
| | $\Delta\alpha_{100/200}$ | | | | | | | | | | | | | |
| | $\Delta\alpha_{200/300}$ | | | | | | | | | | | | | |
| $\Delta\alpha_{200/300}$-$\Delta\alpha_{50/100}$ | | | | | | | | | | | | | | |
| Fictive viscosity $\log_{10}\eta$ (dPa · sec) | | 14.1 | 14.1 | 14.1 | 14.1 | 14.1 | 14.1 | 14.1 | 14.1 | 14.1 | 14.1 | 14.1 | 14.1 | 14.1 |
| (1) | | 2.96 | 3.04 | 3.04 | 3.04 | 3.04 | 2.96 | 3.04 | 2.88 | 2.94 | 2.94 | 2.94 | 2.95 | 2.97 |
| (2) | | 3.45 | 3.45 | 3.44 | 3.45 | 3.44 | 3.34 | 3.45 | 3.27 | 3.37 | 3.37 | 3.37 | 3.37 | 3.37 |
| (3) | | 3.79 | 3.73 | 3.79 | 3.69 | 3.79 | 3.59 | 3.73 | 3.59 | 3.69 | 3.69 | 3.69 | 3.69 | 3.68 |
| (4) | | 1.28 | 1.23 | 1.24 | 1.22 | 1.25 | 1.23 | 1.24 | 1.25 | 1.25 | 1.25 | 1.25 | 1.25 | 1.24 |
| Density (g/cm³) | | (2.49) | (2.55) | (2.49) | (2.62) | (2.61) | (2.66) | (2.72) | (2.52) | (2.50) | (2.49) | (2.47) | (2.47) | (2.46) |
| Glass transition point Tg (° C.) | | (705) | (736) | (819) | (739) | (814) | (815) | (831) | (798) | (750) | (759) | (756) | (782) | (782) |
| Young's modulus (GPa) | | (82.7) | (73.4) | (86.6) | (70.0) | (79.7) | (76.6) | (77.5) | (81.5) | (80.0) | (81.3) | (82.0) | (86.4) | (85.0) |
| $T_2$ (° C.) | | (1540) | (1682) | (1748) | (1725) | (1796) | (1854) | (1857) | (1772) | (1664) | (1672) | (1660) | (1702) | (1720) |
| $T_4$ (° C.) | | (1199) | (1310) | (1373) | (1339) | (1417) | (1442) | (1453) | (1385) | (1299) | (1305) | (1296) | (1325) | (1336) |
| Devitrification temperature (° C.) | | | | | | | | | | | | | | |
| Devitrification viscosity $\log_{10}\eta_{TL}$ (dPa · sec) | | | | | | | | | | | | | | |
| HF weight loss value ((mg/cm²)/min) | | (0.21) | (0.18) | (0.10) | (0.17) | (0.07) | (0.07) | (0.09) | (0.06) | (0.14) | (0.14) | (0.15) | (0.09) | (0.09) |
| Photoelastic constant (nm/(MPa · cm)) | | (29.7) | (30.7) | (28.3) | (29.9) | (28.1) | (26.9) | (25.5) | (29.1) | (30.1) | (29.7) | (30.0) | (28.6) | (29.1) |

TABLE 4

| | | Example 40 | Example 41 | Example 42 | Example 43 | Example 44 | Example 45 | Example 46 | Example 47 | Example 48 | Example 49 | Example 50 | Example 51 | Example 52 |
|---|---|---|---|---|---|---|---|---|---|---|---|---|---|---|
| Composition (mol %) | $SiO_2$ | 67.1 | 70.0 | 69.0 | 68.0 | 69.8 | 68.5 | 67.6 | 60.0 | 58.0 | 71.0 | 69.0 | 70.0 | 70.0 |
| | $Al_2O_3$ | 12.5 | 11.1 | 12.1 | 13.3 | 13.1 | 14.3 | 15.0 | 13.0 | 13.4 | 8.0 | 9.0 | 12.0 | 12.0 |
| | $B_2O_3$ | 5.5 | 1.9 | 2.0 | 1.5 | 2.4 | 3.7 | 3.7 | 8.0 | 10.0 | 4.6 | 6.4 | 2.4 | 2.4 |
| | MgO | 8.5 | 10.3 | 9.8 | 10.1 | 8.3 | 5.7 | 6.8 | 15.0 | 14.4 | 12.0 | 11.1 | 8.0 | 8.0 |
| | CaO | 2.0 | 6.5 | 7.0 | 7.1 | 2.4 | 2.0 | 0.5 | 3.6 | 4.2 | 1.4 | 1.0 | 5.6 | 5.6 |
| | SrO | 4.4 | 0.2 | 0.0 | 0.0 | 0.0 | 1.8 | 0.4 | 0.4 | 0.0 | 2.0 | 1.5 | 2.0 | 2.0 |
| | BaO | 0.0 | 0.0 | 0.0 | 0.0 | 4.0 | 4.0 | 6.0 | 0.0 | 0.0 | 1.0 | 2.0 | 0.0 | 0.0 |
| | ZnO | | | | | | | | | | | | | |
| | CaO + SrO + BaO | 6.4 | 6.7 | 7.0 | 7.1 | 6.4 | 7.8 | 6.9 | 4.0 | 4.2 | 4.4 | 4.5 | 7.6 | 7.6 |
| Cooling rate (° C./min) | | 1 | 1 | 1 | 1 | 1 | 1 | 1 | 1 | 1 | 1 | 1 | 40 | 100 |
| Average thermal expansion coefficient (ppm/° C.) | $\alpha_{50/100}$ | | | | | | | | | | | | 3.00 | 2.99 |
| | $\alpha_{100/200}$ | | | | | | | | | | | | 3.46 | 3.42 |
| | $\alpha_{200/300}$ | | | | | | | | | | | | 3.76 | 3.75 |
| Difference in average thermal expansion coefficient from silicon substrate (ppm/° C.) | $\Delta\alpha_{50/100}$ | | | | | | | | | | | | 1.25 | 1.25 |
| | $\Delta\alpha_{100/200}$ | | | | | | | | | | | | 0.06 | 0.05 |
| | $\Delta\alpha_{200/300}$ | | | | | | | | | | | | 0.09 | 0.05 |
| $\Delta\alpha_{200/300}$-$\Delta\alpha_{50/100}$ | | | | | | | | | | | | | 0.07 | 0.06 |
| Fictive viscosity $\log_{10}\eta_{fz}$ (dPa·sec) | | 14.1 | 14.1 | 14.1 | 14.1 | 14.1 | 14.1 | 14.1 | 14.1 | 14.1 | 14.1 | 14.1 | 0.02 | 0.02 |
| (1) | | 2.94 | 2.94 | 2.93 | 2.91 | 2.94 | 3.01 | 3.00 | 2.92 | 2.93 | 3.00 | 3.01 | 12.5 | 12.1 |
| (2) | | 3.37 | 3.37 | 3.37 | 3.37 | 3.38 | 3.45 | 3.46 | 3.43 | 3.44 | 3.38 | 3.40 | 3.02 | 3.04 |
| (3) | | 3.69 | 3.69 | 3.71 | 3.74 | 3.69 | 3.76 | 3.77 | 3.78 | 3.78 | 3.63 | 3.63 | 3.45 | 3.46 |
| (4) | | 1.26 | 1.25 | 1.26 | 1.28 | 1.26 | 1.25 | 1.26 | 1.29 | 1.29 | 1.22 | 1.22 | 3.76 | 3.77 |
| Density (g/cm³) | | (2.51) | (2.47) | (2.48) | (2.50) | (2.58) | (2.60) | (2.64) | (2.49) | (2.47) | (2.48) | (2.49) | 1.24 | 1.24 |
| Glass transition point Tg (° C.) | | (743) | (770) | (774) | (783) | (780) | (775) | (778) | (712) | (695) | (728) | (717) | (2.49) | (2.49) |
| | | | | | | | | | | | | | (771) | (771) |
| Young's modulus (GPa) | | (80.3) | (86.1) | (86.8) | (88.5) | (82.5) | (80.0) | (80.0) | (84.3) | (82.6) | (79.2) | (77.2) | (84.2) | (84.2) |
| $T_2$ (° C.) | | (1660) | (1684) | (1673) | (1659) | (1720) | (1715) | (1712) | (1533) | (1509) | (1699) | (1683) | (1696) | (1696) |
| $T_4$ (° C.) | | (1292) | (1308) | (1304) | (1301) | (1340) | (1340) | (1340) | (1197) | (1176) | (1298) | (1287) | (1320) | (1320) |
| Devitrification temperature (° C.) | | | | | | | | | | | | | | |
| Devitrification viscosity $\log_{10}\eta_{fz}$ (dPa·sec) | | | | | | | | | | | | | | |
| HF weight loss value ((mg/cm²)/min) | | (0.13) | (0.10) | (0.11) | (0.13) | (0.11) | (0.14) | (0.15) | (0.21) | (0.24) | (0.08) | (0.10) | | |
| Photoelastic constant (nm/(MPa·cm)) | | (29.8) | (28.7) | (28.5) | (27.8) | (27.5) | (27.9) | (27.0) | (29.4) | (30.2) | (30.3) | (30.5) | | |

TABLE 5

| | | Example 53 | Example 54 | Example 55 | Example 56 | Example 57 | Example 58 | Example 59 | Example 60 | Example 61 | Example 62 | Example 63 | Example 64 | Example 65 |
|---|---|---|---|---|---|---|---|---|---|---|---|---|---|---|
| Composition (mol %) | SiO₂ | 65.9 | 65.9 | 68.0 | 68.0 | 68.0 | 68.0 | 68.0 | 68.0 | 66.1 | 68.6 | 71.9 | 55.4 | 67.2 |
| | Al₂O₃ | 12.9 | 12.9 | 13.0 | 13.0 | 13.0 | 13.0 | 13.0 | 13.0 | 11.3 | 11.4 | 12.6 | 13.6 | 11.3 |
| | B₂O₃ | 6.2 | 6.2 | 4.7 | 4.7 | 5.8 | 5.8 | 6.4 | 6.4 | 7.8 | 7.9 | 1.7 | 6.1 | 10.0 |
| | MgO | 8.0 | 8.0 | 6.0 | 4.7 | 4.2 | 4.2 | 3.6 | 3.6 | 5.1 | 2.5 | 4.0 | 23.0 | 4.6 |
| | CaO | 4.0 | 4.0 | 5.3 | 6.0 | 5.0 | 5.0 | 5.0 | 5.0 | 4.5 | 9.1 | 5.0 | 0.0 | 5.5 |
| | SrO | 3.0 | 3.0 | 3.0 | 5.3 | 4.0 | 4.0 | 4.0 | 4.0 | 5.2 | 0.5 | 1.2 | 0.0 | 0.0 |
| | BaO | 0.0 | 0.0 | 0.0 | 3.0 | 0.0 | 0.0 | 0.0 | 0.0 | 0.0 | 0.0 | 3.6 | 0.0 | 1.4 |
| | ZnO | | | | 0.0 | | | | | | | | 1.9 | 0.0 |
| | CaO + SrO + BaO | 7.0 | 7.0 | 8.3 | 8.3 | 9.0 | 9.0 | 9.0 | 9.0 | 9.7 | 9.6 | 9.8 | 0.0 | 6.9 |
| Cooling rate (° C./min) | | 40 | 100 | 40 | 100 | 40 | 100 | 40 | 100 | 40 | 700 | 300 | 1 | 1 |
| Average thermal expansion coefficient (ppm/° C.) | α₅₀/₁₀₀ | 3.00 | 3.06 | 3.03 | 3.02 | 3.04 | 3.09 | 3.05 | 3.07 | 3.38 | 3.12 | 3.23 | 3.11 | 2.79 |
| | α₁₀₀/₂₀₀ | 3.43 | 3.46 | 3.46 | 3.44 | 3.45 | 3.50 | 3.49 | 3.47 | 3.75 | 3.45 | 3.60 | 3.64 | 3.14 |
| | α₂₀₀/₃₀₀ | 3.77 | 3.74 | 3.75 | 3.76 | 3.70 | 3.77 | 3.79 | 3.75 | 4.02 | 3.68 | 3.87 | 4.09 | 3.38 |
| Difference in average thermal expansion coefficient from silicon substrate (ppm/° C.) | Δα₅₀/₁₀₀ | 1.26 | 1.22 | 1.24 | 1.24 | 1.22 | 1.22 | 1.24 | 1.22 | 1.19 | 1.18 | 1.20 | 1.31 | 1.21 |
| | Δα₁₀₀/₂₀₀ | 0.06 | 0.11 | 0.09 | 0.08 | 0.10 | 0.15 | 0.11 | 0.12 | 0.44 | 0.17 | 0.29 | 0.17 | -0.15 |
| | Δα₂₀₀/₃₀₀ | 0.06 | 0.10 | 0.10 | 0.07 | 0.09 | 0.14 | 0.12 | 0.10 | 0.38 | 0.08 | 0.24 | 0.28 | -0.23 |
| | | 0.08 | 0.05 | 0.06 | 0.07 | 0.01 | 0.08 | 0.10 | 0.06 | 0.33 | -0.01 | 0.18 | 0.40 | -0.31 |
| Δα₂₀₀/₃₀₀-Δα₅₀/₁₀₀ | | 0.02 | -0.06 | -0.03 | -0.01 | -0.09 | -0.07 | -0.01 | -0.06 | -0.11 | -0.19 | -0.11 | 0.23 | -0.16 |
| Fictive viscosity log₁₀η (dPa · sec) | | 12.5 | 12.1 | 12.5 | 12.1 | 12.5 | 12.1 | 12.5 | 12.1 | 12.5 | 11.2 | 11.6 | 14.1 | 14.1 |
| (1) | | 3.01 | 3.03 | 3.03 | 3.05 | 3.07 | 3.08 | 3.05 | 3.06 | 3.36 | 3.10 | 3.25 | 2.75 | 2.86 |
| (2) | | 3.45 | 3.47 | 3.46 | 3.47 | 3.47 | 3.49 | 3.45 | 3.46 | 3.75 | 3.46 | 3.66 | 3.34 | 3.22 |
| (3) | | 3.76 | 3.77 | 3.76 | 3.77 | 3.76 | 3.77 | 3.72 | 3.73 | 4.01 | 3.67 | 3.92 | 3.78 | 3.43 |
| (4) | | 1.25 | 1.25 | 1.24 | 1.24 | 1.23 | 1.22 | 1.22 | 1.22 | 1.19 | 1.18 | 1.21 | 1.33 | 1.20 |
| Density (g/cm³) | | (2.49) | (2.49) | (2.49) | (2.49) | (2.49) | (2.49) | (2.48) | (2.48) | 2.51 | 2.41 | 2.58 | 2.54 | 2.42 |
| Glass transition point Tg (° C.) | | (738) | (738) | (756) | (756) | (747) | (747) | (743) | (743) | 710 | (723) | (787) | (720) | (703) |
| Young's modulus (GPa) | | (80.6) | (80.6) | (81.1) | (81.1) | (78.4) | (78.4) | (77.5) | (77.5) | 76 | (75.7) | (80.6) | (89.9) | (73.3) |
| T₂ (° C.) | | (1643) | (1643) | (1680) | (1680) | (1689) | (1689) | (1691) | (1691) | 1645 | (1700) | (1761) | (1444) | (1684) |
| T₄ (° C.) | | (1279) | (1279) | (1308) | (1308) | (1312) | (1312) | (1312) | (1312) | 1275 | (1302) | (1369) | (1143) | (1285) |
| Devitrification temperature (° C.) | | | | | | | | | | 1270 | | | | |
| Devitrification viscosity log₁₀η_TL (dPa · sec) | | | | | | | | | | | | | | |
| HF weight loss value ((mg/cm²)/min) | | | | | | | | | | (0.16) | (0.11) | (0.10) | (0.25) | (0.11) |
| Photoelastic constant (nm/(MPa · cm) | | | | | | | | | | 30.6 | 33.8 | (28.0) | (20.6) | (32.9) |

TABLE 6

| | | Example 66 | Example 67 | Example 68 | Example 69 | Example 70 | Example 71 | Example 72 | Example 73 | Example 74 | Example 75 | Example 76 | Example 77 | Example 78 |
|---|---|---|---|---|---|---|---|---|---|---|---|---|---|---|
| Composition (mol %) | $SiO_2$ | 64.3 | 66.0 | 63.6 | 60.0 | 64.2 | 65.9 | 65.9 | 65.9 | 64.8 | 64.0 | 66.2 | 66.5 | 66.0 |
| | $Al_2O_3$ | 13.0 | 12.1 | 13.3 | 13.5 | 12.8 | 14.0 | 14.0 | 14.0 | 15.5 | 16.0 | 16.0 | 13.5 | 13.0 |
| | $B_2O_3$ | 7.0 | 9.7 | 10.9 | 14.5 | 10.7 | 7.3 | 6.8 | 6.6 | 7.8 | 8.6 | 6.4 | 6.6 | 7.4 |
| | MgO | 9.0 | 5.5 | 5.5 | 5.7 | 6.5 | 4.0 | 5.0 | 5.6 | 4.3 | 4.2 | 4.0 | 6.8 | 7.1 |
| | CaO | 5.7 | 1.0 | 1.0 | 1.0 | 1.0 | 7.0 | 6.0 | 5.0 | 1.6 | 1.0 | 1.0 | 1.0 | 1.0 |
| | SrO | 1.0 | 5.8 | 5.8 | 5.3 | 1.4 | 1.8 | 2.3 | 2.9 | 4.0 | 2.3 | 1.4 | 5.7 | 5.5 |
| | BaO | 0.0 | 0.0 | 0.0 | 0.0 | 3.4 | 0.0 | 0.0 | 0.0 | 2.0 | 3.9 | 5.0 | 0.0 | 0.0 |
| | ZnO | 0.0 | 0.0 | 0.0 | 0.0 | 0.0 | 0.0 | 0.0 | 0.0 | 0.0 | 0.0 | 0.0 | 0.0 | 0.0 |
| | CaO + SrO + BaO | 6.7 | 6.8 | 6.8 | 6.3 | 5.8 | 8.8 | 8.3 | 7.9 | 7.6 | 7.2 | 7.4 | 6.7 | 6.5 |
| Cooling rate (° C./min) | | 40 | 40 | 40 | 40 | 40 | 1 | 1 | 1 | 40 | 40 | 40 | 40 | 40 |
| Average thermal expansion coefficient (ppm/° C.) | $\alpha_{50/100}$ | 2.97 | 2.99 | 2.98 | 3.06 | 2.97 | 2.89 | 2.91 | 2.91 | 2.93 | 2.95 | 2.91 | 2.97 | 2.96 |
| | $\alpha_{100/200}$ | 3.39 | 3.37 | 3.35 | 3.43 | 3.33 | 3.31 | 3.32 | 3.31 | 3.31 | 3.32 | 3.27 | 3.39 | 3.34 |
| | $\alpha_{200/300}$ | 3.73 | 3.63 | 3.60 | 3.69 | 3.56 | 3.61 | 3.64 | 3.59 | 3.60 | 3.63 | 3.56 | 3.67 | 3.66 |
| Difference in average thermal expansion coefficient from silicon substrate (ppm/° C.) | $\Delta\alpha_{50/100}$ | 1.26 | 1.21 | 1.21 | 1.21 | 1.20 | 1.25 | 1.25 | 1.23 | 1.23 | 1.23 | 1.22 | 1.24 | 1.24 |
| | $\Delta\alpha_{100/200}$ | 0.02 | 0.05 | 0.03 | 0.11 | 0.03 | −0.05 | −0.03 | −0.03 | −0.01 | 0.00 | −0.1 | 0.03 | 0.01 |
| | $\Delta\alpha_{200/300}$ | 0.03 | 0.00 | −0.02 | 0.07 | −0.04 | −0.05 | −0.04 | −0.06 | −0.06 | −0.05 | −0.1 | 0.02 | −0.03 |
| $\Delta\alpha_{200/300}$-$\Delta\alpha_{50/100}$ | | 0.04 | −0.06 | −0.09 | 0.00 | −0.13 | −0.08 | −0.05 | −0.10 | −0.09 | −0.06 | −0.1 | −0.02 | −0.03 |
| Fictive viscosity $\log_{10}\eta$ (dPa·sec) | | 0.02 | −0.11 | −0.12 | −0.11 | −0.16 | −0.03 | −0.02 | −0.07 | −0.08 | −0.06 | −0.10 | −0.05 | −0.04 |
| | | 12.5 | 12.5 | 12.5 | 12.5 | 12.5 | 14.1 | 14.1 | 14.1 | 12.5 | 12.5 | 12.5 | 12.5 | 12.5 |
| (1) | | 2.98 | 3.00 | 2.98 | 2.98 | 3.00 | 2.92 | 2.91 | 2.90 | 2.95 | 2.95 | 2.95 | 2.95 | 2.97 |
| (2) | | 3.43 | 3.40 | 3.40 | 3.40 | 3.41 | 3.32 | 3.33 | 3.33 | 3.39 | 3.40 | 3.40 | 3.39 | 3.40 |
| (3) | | 3.74 | 3.64 | 3.66 | 3.64 | 3.64 | 3.62 | 3.63 | 3.64 | 3.69 | 3.68 | 3.69 | 3.69 | 3.69 |
| (4) | | 1.25 | 1.22 | 1.23 | 1.23 | 1.22 | 1.24 | 1.25 | 1.26 | 1.25 | 1.25 | 1.25 | 1.25 | 1.25 |
| Density (g/cm³) | | (2.47) | (2.47) | (2.48) | (2.46) | (2.52) | ((2.46)) | (2.47) | (2.48) | (2.54) | (2.57) | (2.60) | (2.52) | (2.51) |
| Glass transition point Tg (° C.) | | (730) | (704) | (698) | (664) | (700) | 750 | 755 | 754 | (741) | (738) | (761) | (739) | (728) |
| Young's modulus (GPa) | | 83.4 | 75.7 | 76.4 | 73.7 | 75.6 | (78.8) | (79.6) | (79.8) | 79.3 | 78.2 | 77.5 | 78.4 | 79.3 |
| $T_2$ (° C.) | | (1616) | (1660) | (1629) | (1580) | (1652) | (1660) | (1657) | (1655) | (1664) | (1665) | (1702) | (1661) | (1653) |
| $T_4$ (° C.) | | (1256) | (1279) | (1260) | (1217) | (1270) | (1290) | (1290) | (1290) | (1300) | (1300) | (1330) | (1295) | (1285) |
| Devitrification temperature (° C.) | | 1350 | 1310 | 1315 | 1315 | 1315 | 1350 | 1350 | 1340 | 1380 | 1380 | 1380 | 1320 | 1310 |
| Devitrification viscosity $\log_{10}\eta_{TL}$ (dPa·sec) | | 3.41 | 3.78 | 3.61 | 3.33 | 3.69 | 3.58 | 3.58 | 3.64 | 3.32 | 3.32 | 3.52 | 3.82 | 3.82 |
| HF weight loss value ((mg/cm²)/min) | | 0.14 | 0.13 | 0.16 | 0.18 | 0.15 | (0.14) | (0.15) | (0.14) | 0.16 | 0.17 | 0.16 | 0.13 | 0.13 |
| Photoelastic constant (nm/(MPa·cm)) | | (30.3) | (32.3) | (32.3) | (33.6) | (31.4) | (31.1) | (30.6) | (30.4) | (30.1) | (29.7) | (28.6) | (30.3) | (30.7) |

TABLE 7

|  |  | Example 79 | Example 80 | Example 81 | Example 82 | Example 83 | Example 84 | Example 85 | Example 86 | Example 87 |
|---|---|---|---|---|---|---|---|---|---|---|
| Composition (mol %) | $SiO_2$ | 66.4 | 66.4 | 66.3 | 66.4 | 66.3 | 66.5 | 66.0 | 66.4 | 66.7 |
|  | $Al_2O_3$ | 12.8 | 13.0 | 12.5 | 12.7 | 12.5 | 12.1 | 13.0 | 12.5 | 12.5 |
|  | $B_2O_3$ | 5.5 | 5.2 | 5.8 | 5.3 | 5.6 | 5.7 | 5.0 | 5.2 | 4.6 |
|  | MgO | 8.0 | 7.2 | 8.0 | 8.0 | 7.6 | 8.2 | 6.3 | 7.3 | 8.0 |
|  | CaO | 4.0 | 7.2 | 3.0 | 4.0 | 4.0 | 3.3 | 8.7 | 5.4 | 7.2 |
|  | SrO | 3.3 | 1.0 | 4.4 | 3.6 | 4.0 | 4.3 | 1.0 | 3.3 | 1.0 |
|  | BaO | 0.0 | 0.0 | 0.0 | 0.0 | 0.0 | 0.0 | 0.0 | 0.0 | 0.0 |
|  | ZnO | 0.0 | 0.0 | 0.0 | 0.0 | 0.0 | 0.0 | 0.0 | 0.0 | 0.0 |
|  | CaO + SrO + BaO | 7.3 | 8.2 | 7.3 | 7.6 | 8.0 | 7.6 | 9.7 | 8.7 | 8.2 |
| Cooling rate (° C./min) |  | 1 | 1 | 1 | 1 | 1 | 1 | 1 | 1 | 1 |
| Average thermal expansion coefficient (ppm/° C.) | $\alpha_{50/100}$ | 2.95 |  | 3.03 | 3.05 | 3.08 | 3.10 | 3.11 | 3.11 | 2.96 |
|  | $\alpha_{100/200}$ | 3.40 |  | 3.47 | 3.49 | 3.53 | 3.53 | 3.56 | 3.57 | 3.42 |
|  | $\alpha_{200/300}$ | 3.70 |  | 3.79 | 3.80 | 3.84 | 3.84 | 3.89 | 3.89 | 3.76 |
| $\alpha_{200/300}/\alpha_{50/100}$ |  | 1.25 |  | 1.25 | 1.25 | 1.25 | 1.24 | 1.25 | 1.25 | 1.27 |
| Difference in average thermal expansion coefficient from silicon substrate (ppm/° C.) | $\Delta\alpha_{50/100}$ | 0.01 |  | 0.09 | 0.10 | 0.13 | 0.15 | 0.17 | 0.17 | 0.02 |
|  | $\Delta\alpha_{100/200}$ | 0.03 |  | 0.11 | 0.12 | 0.16 | 0.16 | 0.20 | 0.20 | 0.06 |
|  | $\Delta\alpha_{200/300}$ | 0.01 |  | 0.10 | 0.11 | 0.15 | 0.15 | 0.20 | 0.20 | 0.07 |
| $\Delta\alpha_{200/300} - \Delta\alpha_{50/100}$ |  | 0.00 |  | 0.02 | 0.01 | 0.01 | −0.01 | 0.03 | 0.03 | 0.05 |
| Fictive viscosity $\log_{10}\eta$ (dPa · sec) |  | 14.1 | 14.1 | 14.1 | 14.1 | 14.1 | 14.1 | 14.1 | 14.1 | 14.1 |
| (1) |  | 2.99 | 2.99 | 3.04 | 3.04 | 3.09 | 3.10 | 3.14 | 3.14 | 3.04 |
| (2) |  | 3.42 | 3.42 | 3.47 | 3.47 | 3.52 | 3.52 | 3.57 | 3.57 | 3.47 |
| (3) |  | 3.74 | 3.74 | 3.79 | 3.80 | 3.84 | 3.83 | 3.89 | 3.89 | 3.79 |
| (4) |  | 1.25 | 1.25 | 1.25 | 1.25 | 1.24 | 1.24 | 1.24 | 1.24 | 1.25 |
| Density (g/cm³) |  | (2.50) | (2.48) | (2.51) | (2.51) | (2.51) | (2.51) | 2.48 | (2.51) | 2.47 |
| Glass transition point Tg (° C.) |  | 749 | (749) | 744 | 747 | 745 | 745 | 761 | 750 | 750 |
| Young's modulus (GPa) |  | (81.1) | (82.5) | (80.0) | (81.2) | (80.4) | (80.0) | 84.0 | (81.2) | 84.4 |
| $T_2$ (° C.) |  | (1650) | (1650) | (1650) | (1650) | (1650) | (1650) | (1646) | (1650) | (1650) |
| $T_4$ (° C.) |  | (1285) | (1284) | (1284) | (1286) | (1285) | (1283) | (1283) | (1286) | (1284) |
| Devitrification temperature (° C.) |  | 1290 |  | 1270 | 1310 | 1290 | 1290 | 1270 | 1270 | 1295 |
| Devitrification viscosity $\log_{10}\eta_{TL}$ (dPa · sec) |  | 3.97 |  | 4.11 | 3.82 | 3.96 | 3.95 | 4.10 | 4.12 | 3.92 |
| HF weight loss value ((mg/cm²)/min) |  | (0.14) | (0.14) | (0.15) | (0.15) | (0.15) | (0.15) | (0.16) | (0.15) | (0.14) |
| Photoelastic constant (nm/(MPa · cm)) |  | (29.7) | (29.8) | (29.8) | (29.6) | (29.8) | (29.8) | (29.6) | (29.6) | (29.5) |

Examples 1 to 60 and 66 to 87 are concerned with working examples, and Examples 61 to 65 are concerned with comparative examples.

In the glass substrates of the present invention of Examples 1 to 60 and 66 to 87 which are concerned with the working examples, since the content of the alkali metal oxide is 0.1% or less, in the heat treatment step of sticking the silicone substrate and the glass substrate to each other, the alkali ion is not diffused into the silicon substrate. In addition, since the average thermal expansion coefficient $\alpha_{50/100}$ at 50° C. to 100° C. is 2.70 ppm/° C. to 3.20 ppm/° C., the average thermal expansion coefficient $\alpha_{200/300}$ at 200° C. to 300° C. is 3.45 ppm/° C. to 3.95 ppm/° C., and the value $\alpha_{200/300}/\alpha_{50/100}$ obtained by dividing $\alpha_{200/300}$ by $\alpha_{50/100}$ is 1.20 to 1.30, in the heat treatment step of sticking the silicon substrate and the glass substrate to each other, the residual strain generated in the silicon substrate easily becomes small.

In the glass substrates of Examples 61 to 65 which are concerned with the comparative examples, the range of at least one of $\alpha_{50/100}$, $\alpha_{200/300}$, and $\alpha_{200/300}/\alpha_{50/100}$ falls outside the scope regarding the glass substrate according to an embodiment of the present invention. Or, in the glass substrates of Examples 61 to 65, at least one of $\Delta\alpha_{50/100}$, $\Delta\alpha_{200/300}$, and ($\Delta\alpha_{200/300} - \Delta\alpha_{50/100}$) falls outside the scope regarding the glass substrate according to an embodiment of the present invention. Alternatively, in the glass substrates of Examples 61 to 65, at least one of the composition of the resulting glass substrate and the conditions (1) to (4) falls outside the scope regarding the glass substrate according to an embodiment of the present invention. For that reason, in the heat treatment step of sticking the silicon substrate and the glass substrate to each other, the residual strain generated in the silicon substrate is liable to become large.

Figure 2:
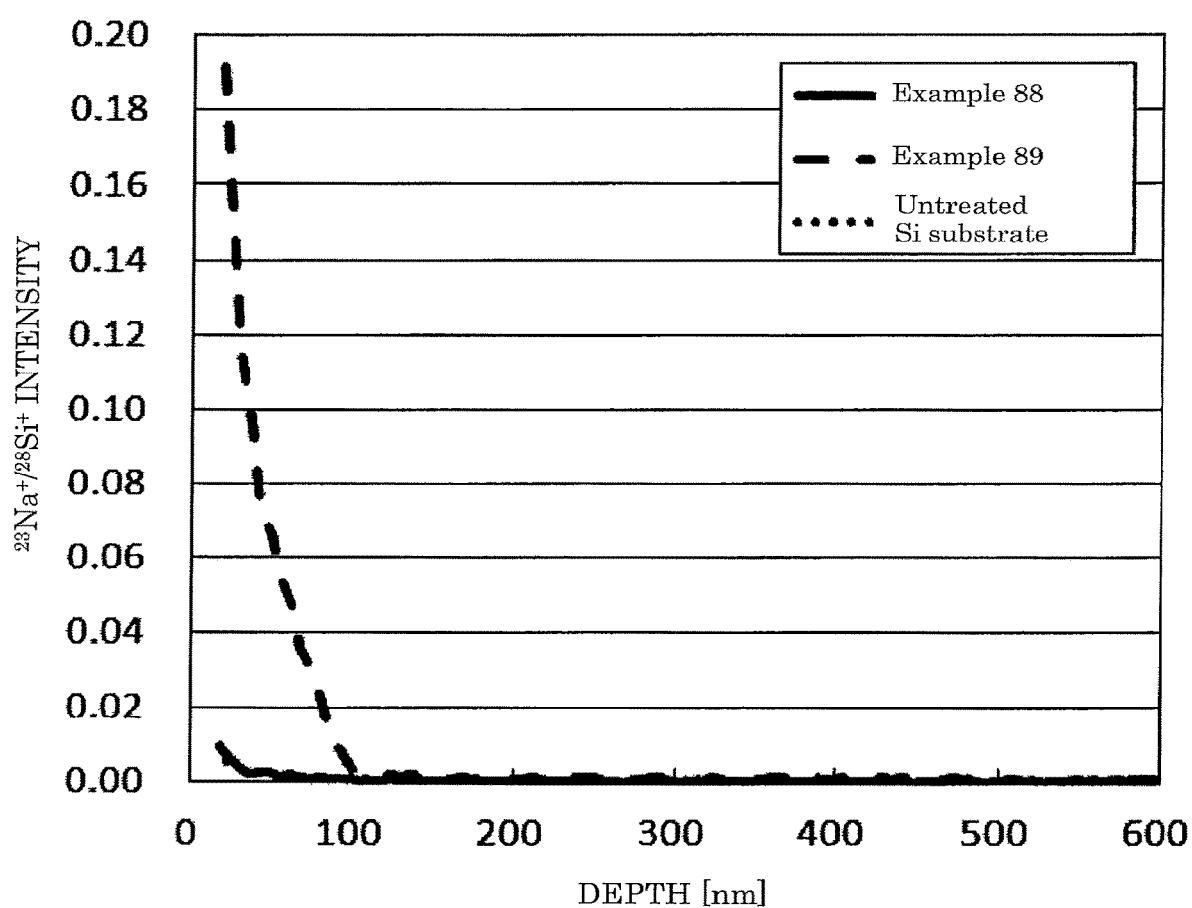
FIG. 2 is a graph showing the SIMS measurement results expressing an influence of the content of an alkali metal oxide.

Next, when each of a glass substrate of Example 88 and a glass substrate of Example 89 was brought into contact with a silicon substrate and then subjected to a heat treatment, a diffusion amount of the alkali metal oxide into the silicon substrate was measured by the secondary ion mass spectrometry (SIMS), and the results are shown in FIG. 2. In the glass substrate of Example 88, the content of the alkali metal oxide ($Na_2O$) is 0.1% or less, whereas in the glass substrate of Example 89, the content of the alkali metal oxide is more than 0.1%. In FIG. 2, the SIMS measurement results of an untreated silicon substrate are also shown for reference.

For the SIMS measurement, ADEPT 1010, manufactured by ULVAC-PHI, INC. was used. A Cs ion was used for a primary ion of the SIMS. As secondary ion species, $^{28}Si^-$ and $^{23}Na^+$ were measured. In the heat treatment of the silicon substrate having been brought into contact with the glass substrate, the temperature was raised from room temperature to 200° C. for 10 minutes, and after keeping at 200° C. for 1 hour, cooling to room temperature was performed for 10 minutes. The compositions of Examples 88 and 89 are shown in Table 8.

TABLE 8

|  |  | Example 88 | Example 89 |
|---|---|---|---|
| Composition (mol %) | $SiO_2$ | 66.8 | 66.1 |
|  | $Al_2O_3$ | 13.0 | 11.3 |
|  | $B_2O_3$ | 4.6 | 7.8 |
|  | MgO | 8.0 | 5.1 |
|  | CaO | 6.6 | 4.5 |
|  | SrO | 1.0 | 5.2 |
|  | BaO | 0.0 | 0.0 |
|  | ZnO | 0.0 | 0.0 |
|  | $Na_2O$ | 0.03 | 0.32 |

Example 88 is one in which 0.03% in outer percentage of $Na_2O$ that is the alkali metal oxide was added to Example 6 and is concerned with a working example. Example 89 is one in which 0.32% in outer percentage of $Na_2O$ that is the alkali metal oxide was added to Example 61 and is concerned with a comparative example. In FIG. 2, the abscissa expresses a depth from the surface on the side coming into contact the glass substrate within the silicon substrate, and the ordinate expresses a value obtained by dividing the detection number of $^{23}Na^+$ for 1 second by $^{28}Si^-$.

It is noted from FIG. 2 that from the silicon substrate coming into contact with the glass substrate of Example 89 in which the content of the alkali metal oxide is more than 0.1%, the Na ion diffused to an extent in the vicinity of 100 nm from the surface layer. It is to be noted that the measurement results of the silicon substrate for reference were substantially coincident with the plots of Example 88. Since the alkali ion has an electric charge, it works as a carrier in the silicon substrate and changes the semiconductor characteristics. On the other hand, in the silicon substrate coming into contact with the glass substrate of Example 88 in which the content of the alkali metal oxide is 0.1% or less, the Na ion was not detected similar to the untreated silicon substrate, and therefore, it is indicated that the diffusion of the Na ion from the glass substrate into the silicon substrate was not generated.

INDUSTRIAL APPLICABILITY

The glass substrate according to the present invention is small in a difference in thermal expansion coefficient from the silicon substrate, and therefore, in the heat treatment step of sticking to the silicon substrate or the sequent heat treatment, the generation of a residual strain to be caused due to the difference in thermal expansion coefficient can be suppressed. For that reason, the glass substrate according to the present invention is suitable as a glass substrate for image sensors, such as MEMS, CMOS, CIS, etc., for which miniaturization of element due to the wafer-level package is effective.

In addition, the glass substrate according to an embodiment of the present invention is suitable as a cover glass for display devices for projection application, for example, a cover glass of LCOS (liquid crystal on silicon). For example, in the LCOS or image sensors, after forming an electronic circuit on a silicon substrate, the cover glass is adhered to the silicon substrate with a resin or a glass frit as an adhesive material. The glass substrate according to the present invention as the cover glass is small in a difference in thermal expansion coefficient from the silicon substrate, and therefore, a stress generated on the adhesive interface when the temperature varies at the time of device production or use is reduced. Thereby, a reduction of color unevenness to be caused due to photoelastic deformation, or an improvement of long-term reliability can be expected.

Furthermore, the glass substrate according to the present invention is suitable as a bored substrate of glass interposer (GIP) or a support glass for semiconductor backgrind. In addition, the glass substrate of the present invention can be suitably used for any application for glass substrate to be used through sticking to a silicon substrate.

While the present invention has been described in detail and with reference to specific embodiments thereof, it will be apparent to one skilled in the art that various changes and modifications can be made therein without departing from the spirit and scope thereof. It is to be noted that the present application is based on a Japanese patent application filed on Feb. 6, 2015 (Japanese Patent Application No. 2015-022719) and a Japanese patent application filed on Dec. 10, 2015 (Japanese Patent Application No. 2015-241303), the entireties of which are incorporated by reference.

DESCRIPTION OF REFERENCE NUMERALS AND SIGNS

10: Silicon substrate
20: Resin
30: Laminated substrate
G1: Glass substrate
The invention claimed is:
1. A glass substrate having:
an average thermal expansion coefficient $\alpha_{50/100}$ at 50° C. to 100° C. of 2.70 ppm/° C. to 3.20 ppm/° C.;
an average thermal expansion coefficient $\alpha_{200/300}$ at 200° C. to 300° C. of 3.45 ppm/° C. to 3.95 ppm/° C.; and
a value $\alpha_{200/300}/\alpha_{50/100}$ obtained by dividing the average thermal expansion coefficient $\alpha_{200/300}$ at 200° C. to 300° C. by the average thermal expansion coefficient $\alpha_{50/100}$ at 50° C. to 100° C. of 1.20 to 1.30,
wherein:
a content of an alkali metal oxide in the glass substrate is 0% to 0.1% as expressed in terms of a molar percentage based on oxides;
a density of the glass substrate is more than 2.46 g/cm$^3$;
the glass substrate comprises a composition containing, as expressed in terms of a molar percentage based on oxides:
$SiO_2$: 50% to 70%,
$Al_2O_3$: 12.1% to 16%,
$B_2O_3$: 0% to 15%,
MgO: 0% to 15%,
CaO: 0% to 13%,
SrO: 0% to 11%, and
BaO: 0% to 9.5%; and
satisfy the following condition (1), condition (2), condition (3), and condition (4):

{0.0177×(content of $SiO_2$)−0.0173×(content of $Al_2O_3$)+0.0377×(content of $B_2O_3$)+0.0771×(content of MgO)+0.1543×(content of CaO)+0.1808×(content of SrO)+0.2082×(content of BaO)+0.0344×(12.3±log$_{10}$ 60−log$_{10}$ η)} is 2.70 to 3.00,    Condition (1):

{0.0181×(content of $SiO_2$)+0.0004×(content of $Al_2O$)+0.0387×(content of $B_2O_3$)+0.0913×(content of MgO)+0.1621×(content of CaO)+

$\{0.1900\times(\text{content of SrO})+0.2180\times(\text{content of BaO})+0.0391\times(12.3+\log_{10} 60-\log_{10} \eta)\}$ is 3.13 to 3.43,       Condition (2):

$\{0.0177\times(\text{content of SiO}_2)+0.0195\times(\text{content of Al}_2\text{O}_3)+0.0323\times(\text{content of B}_2\text{O}_3)+0.1015\times(\text{content of MgO})+0.1686\times(\text{content of CaO})+0.1990\times(\text{content of SrO})+0.2179\times(\text{content of BaO})+0.0312\times(12.3+\log_{10}60-\log_{10}\eta)\}$ is 3.45 to 3.95, and       Condition (3):

$\{0.0111\times(\text{content of SiO}_2)+0.0250\times(\text{content of Al}_2\text{O}_3)+0.0078\times(\text{content of B}_2\text{O}_3)+0.0144\times(\text{content of MgO})+0.0053\times(\text{content of CaO})+0.0052\times(\text{content of SrO})+0.0013\times(\text{content of BaO})-0.0041\times(12.3+\log_{10} 60-\log_{10} \eta)\}$ is 1.20 to 1.30,       Condition (4):

in which the content of $SiO_2$, the content of $Al_2O_3$, the content of $B_2O_3$, the content of MgO, the content of CaO, the content of SrO, and the content of BaO are respectively a content of each of the components contained in the glass substrate as expressed in terms of a molar percentage based on the oxides, and $\eta$ is a fictive viscosity (unit: dPa·sec).

2. The glass substrate according to claim 1, wherein the average thermal expansion coefficient $\alpha_{200/300}$ at 200° C. to 300° C. is 3.55 ppm/° C. to 3.85 ppm/° C.

3. The glass substrate according to claim 1, wherein the composition comprises, as expressed in terms of a molar percentage based on the oxides:

$SO_2$: 50% to 70%;
$Al_2O_3$: 12.1% to 16%;
$B_2O_3$: 0% to 15%;
MgO: 0% to 15%;
CaO: 0.1% to 13%;
SrO: 0% to 11%; and
BaO: 0% to 9.5%.

4. The glass substrate according to claim 1, wherein:
a total content of CaO, SrO, and BaO is 7% or more as expressed in terms of a molar percentage based on the oxides;
a relation of $\{(\text{content of Al}_2\text{O}_3) \geq (\text{content of MgO})\}$; is satisfied; and
a devitrification viscosity of the glass substrate is $10^{3.8}$ dPa·sec or more.

5. The glass substrate according to claim 1, having an average thermal expansion coefficient $\alpha_{100/200}$ at 100° C. to 200° C. of 3.13 ppm/° C. to 3.63 ppm/° C.

6. The glass substrate according to claim 1, having a content of $Fe_2O_3$ being 200 ppm or less as expressed in terms of parts per million mass based on the oxides.

7. The glass substrate according to claim 1, having a Young's modulus of 80 GPa or more.

8. The glass substrate according to claim 1, having a thickness of 1.0 mm or less.

9. The glass substrate according to claim 1, having an area of 0.03 m² or more.

10. The glass substrate according to claim 1, wherein a density of defect having a size of 0.5 μm or more and 1 mm or less contained in the glass substrate is one or less per cm².

11. The glass substrate according to claim 1, having a fictive viscosity of $10^{11.10}$ dPa·sec to $10^{14.1}$ dPa·sec.

12. The glass substrate according to claim 1, having a weight loss value relative to a 5 mass % hydrofluoric aqueous solution at 25° C. of 0.05 (mg/cm²)/min or more and 0.20 (mg/cm²)/min or less.

13. The glass substrate according to claim 1, having a photoelastic constant of 31 nm/(MPa·cm) or less.

14. The glass substrate according to claim 1, satisfying the following condition (1), condition (2), condition (3), and condition (4):

$\{0.0177\times(\text{content of SiO}_2)-0.0173\times(\text{content of Al}_2\text{O}_3)+0.0377\times(\text{content of B}_2\text{O}_3)+0.0771\times(\text{content of MgO})+0.1543\times(\text{content of CaO})+0.1808\times(\text{content of SrO})+0.2082\times(\text{content of BaO})+0.0344\times(12.3\pm\log_{10} 60-\log_{10} \eta)\}$ is 2.70 to 2.96,       Condition (1):

$\{0.0181\times(\text{content of SiO}_2)+0.0004\times(\text{content of Al}_2\text{O})+0.0387\times(\text{content of B}_2\text{O}_3)+0.0913\times(\text{content of MgO})+0.1621\times(\text{content of CaO})+0.1900\times(\text{content of SrO})+0.2180\times(\text{content of BaO})+0.0391\times(12.3+\log_{10} 60-\log_{10} \eta)\}$ is 3.13 to 3.41,       Condition (2):

$\{0.0177\times(\text{content of SiO}_2)+0.0195\times(\text{content of Al}_2\text{O}_3)+0.0323\times(\text{content of B}_2\text{O}_3)+0.1015\times(\text{content of MgO})+0.1686\times(\text{content of CaO})+0.1990\times(\text{content of SrO})+0.2179\times(\text{content of BaO})+0.0312\times(12.3+\log_{10}60-\log_{10}\eta)\}$ is 3.45 to 3.95, and       Condition (3):

$\{0.0111\times(\text{content of SiO}_2)+0.0250\times(\text{content of Al}_2\text{O}_3)+0.0078\times(\text{content of B}_2\text{O}_3)+0.0144\times(\text{content of MgO})+0.0053\times(\text{content of CaO})+0.0052\times(\text{content of SrO})+0.0013\times(\text{content of BaO})-0.0041\times(12.3+\log_{10} 60-\log_{10} \eta)\}$ is 1.20 to 1.30.       Condition (4):

15. A laminated substrate, comprising:
the glass substrate according to claim 1; and
a silicon substrate laminated on the glass substrate.

16. A laminated substrate, comprising:
the glass substrate of claim 1; and
a silicon substrate laminated on the glass substrate,
wherein:
a difference $\Delta\alpha_{50/100}$ ($=\alpha_{50/100}-\alpha_{Si50/100}$) between an average thermal expansion coefficient $\alpha_{50/100}$ at 50° C. to 100° C. of the glass substrate and an average thermal expansion coefficient $\alpha_{Si50/100}$ at 50° C. to 100° C. of the silicon substrate is −0.25 ppm/° C. to 0.25 ppm/° C.;
a difference $\Delta\alpha_{200/300}$ ($=\alpha_{200/300}-\alpha_{Si200/300}$) between an average thermal expansion coefficient $\alpha_{200/300}$ at 200° C. to 300° C. of the glass substrate and an average thermal expansion coefficient $\alpha_{Si200/300}$ at 200° C. to 300° C. of the silicon substrate is −0.25 ppm/° C. to 0.25 ppm/° C.; and
($\Delta\alpha_{200/300}-\Delta\alpha_{50/100}$) is −0.16 ppm/° C. to 0.16 ppm/° C.

17. The laminated substrate according to claim 16, wherein a difference $\Delta\alpha_{100/200}$ ($=\alpha_{100/200}-\alpha_{Si100/200}$) between an average thermal expansion coefficient $\alpha_{100/200}$ at 100° C. to 200° C. of the glass substrate and an average thermal expansion coefficient $\alpha_{Si100/200}$ at 100° C. to 200° C. of the silicon substrate is −0.25 ppm/° C. to 0.25 ppm/° C.

18. A method for producing a glass substrate according to claim 1, the method comprising:
a melting step of heating glass raw materials to obtain a molten glass;
a refining step of removing bubbles from the molten glass;
a forming step of forming the molten glass into a sheet-like shape to obtain a glass ribbon; and
a cooling step of gradually cooling the glass ribbon to a room temperature state,
wherein the resulting glass substrate has a composition as defined in claim 1.

* * * * *

UNITED STATES PATENT AND TRADEMARK OFFICE
CERTIFICATE OF CORRECTION

PATENT NO.         : 10,759,691 B2
APPLICATION NO.    : 15/666862
DATED              : September 1, 2020
INVENTOR(S)        : Shuhei Nomura et al.

Page 1 of 1

It is certified that error appears in the above-identified patent and that said Letters Patent is hereby corrected as shown below:

On the Title Page

Item (63), the related PCT application number is incorrect. Item (63) should read:
-- (63) Continuation of application No. PCT/JP2016/053047, filed on Feb. 2, 2016 --

Signed and Sealed this
Thirteenth Day of October, 2020

Andrei Iancu
*Director of the United States Patent and Trademark Office*